(12) United States Patent
Wang et al.

(10) Patent No.: US 12,360,697 B2
(45) Date of Patent: Jul. 15, 2025

(54) METHOD FOR SELECTING A DATA BLOCK TO BE COLLECTED IN GC AND STORAGE DEVICE THEREOF

(71) Applicant: BEIJING MEMBLAZE TECHNOLOGY CO., LTD, Beijing (CN)

(72) Inventors: Jinyi Wang, Beijing (CN); Xiangfeng Lu, Beijing (CN)

(73) Assignee: BEIJING MEMBLAZE TECHNOLOGY CO., LTD, Beijing (CN)

( * ) Notice: Subject to any disclaimer, the term of this patent is extended or adjusted under 35 U.S.C. 154(b) by 124 days.

(21) Appl. No.: 17/844,513

(22) Filed: Jun. 20, 2022

(65) Prior Publication Data

US 2022/0326872 A1 Oct. 13, 2022

Related U.S. Application Data

(63) Continuation of application No. 17/044,402, filed as application No. PCT/CN2018/093198 on Jun. 27, 2018, now Pat. No. 11,416,162.

(30) Foreign Application Priority Data

Sep. 27, 2017 (CN) .......................... 201710888411.2
May 31, 2018 (CN) .......................... 201810548653.1

(51) Int. Cl.
*G06F 3/06* (2006.01)

(52) U.S. Cl.
CPC .......... *G06F 3/0652* (2013.01); *G06F 3/0608* (2013.01); *G06F 3/0659* (2013.01); *G06F 3/0679* (2013.01)

(58) Field of Classification Search
CPC .... G06F 3/0652; G06F 3/0608; G06F 3/0659; G06F 3/0679; G06F 3/064; G06F 12/02
See application file for complete search history.

(56) References Cited

U.S. PATENT DOCUMENTS

2007/0208904 A1 9/2007 Hsieh et al.
2007/0244939 A1 * 10/2007 Devarakonda ........ G06F 16/221
(Continued)

FOREIGN PATENT DOCUMENTS

| CN | 101030166 A | 9/2007 |
|---|---|---|
| CN | 102243613 A | 11/2011 |

(Continued)

OTHER PUBLICATIONS

International Search Report issued in corresponding International Application No. PCT/CN2018/093198, mailed Sep. 27, 2018, 5 pgs.
(Continued)

*Primary Examiner* — Jared I Rutz
*Assistant Examiner* — Jonah C Krieger
(74) *Attorney, Agent, or Firm* — HAUPTMAN HAM, LLP

(57) ABSTRACT

The present application relates to a garbage collection method and a storage device for reducing write amplification. A method for selecting a data block to be collected in garbage collection, including: obtaining, according to a first selection policy, a first data block to be collected; determining, according to a first rejection policy, whether to refuse to collect the first data block to be collected; and if according to the first rejection policy, rejection to collect of the first data block to be collected is determined, not performing garbage collection on the first data block to be collected.

15 Claims, 10 Drawing Sheets

(56) References Cited

U.S. PATENT DOCUMENTS

| | | | |
|---|---|---|---|
| 2011/0283049 A1* | 11/2011 | Kang | G11C 16/16 |
| | | | 711/170 |
| 2012/0297128 A1 | 11/2012 | Eleftheriou et al. | |
| 2013/0290598 A1* | 10/2013 | Fiske | G06F 3/0625 |
| | | | 711/E12.008 |
| 2014/0101373 A1* | 4/2014 | Lee | G06F 3/0613 |
| | | | 711/103 |
| 2015/0186056 A1 | 7/2015 | Miura et al. | |
| 2016/0239412 A1* | 8/2016 | Wada | G06F 3/0688 |
| 2018/0081587 A1* | 3/2018 | Tang | G06F 16/1787 |
| 2018/0341413 A1* | 11/2018 | Lai | G06F 3/0659 |

FOREIGN PATENT DOCUMENTS

| | | |
|---|---|---|
| CN | 102799534 A | 11/2012 |
| CN | 103902465 A | 7/2014 |

OTHER PUBLICATIONS

Written Opinion issued in corresponding International Application No. PCT/CN2018/093198, mailed Sep. 27, 2018, 8 pgs.
Open NAND Flash Interface Specification, Revision 3.0, Hynix Semiconductor et al., ONFI Workgroup Technical Editor, Mar. 9, 2011; www.onfi.org; 288 pgs.

* cited by examiner

METHOD FOR SELECTING A DATA BLOCK TO BE COLLECTED IN GC AND STORAGE DEVICE THEREOF

CROSS REFERENCE TO RELATED APPLICATION

The present application is a Continuation of U.S. patent application Ser. No. 17/044,402, filed Jan. 14, 2021, which is a National Phase of International Application Number PCT/CN2018/093198, filed Jun. 27, 2018, and claims priority to Chinese Patent Application No. 201810548653.1 (the title of invention is GARBAGE COLLECTION METHOD CAPABLE OF REMARKABLY REDUCING WRITE AMPLIFICATION AND STORAGE DEVICE) filed on May 31, 2018, and Chinese Patent Application No. 201710888411.2 (the title of invention is GARBAGE DATA RECOVERY METHOD AND SOLID-STATE STORAGE DEVICE) filed on Sep. 27, 2017.

TECHNICAL FIELD

The present application relates to a storage device, and in particular, to garbage collection of the storage device.

BACKGROUND

FIG. 1 shows a block diagram of a storage device. A solid-state storage device 100 is coupled to a host and configured to provide storage capability for the host. The host may be coupled to the solid-state storage device 100 in various ways, including but not limited to, a Serial Advanced Technology Attachment (SATA), a Small Computer System Interface (SCSI), a Serial Attached SCSI (SAS), Integrated Drive Electronics (IDE), a Universal Serial Bus (USB), Peripheral Component Interconnect Express (PCIE), NVM Express (NVMe), the Ethernet, a fiber channel, and a wireless communication network, etc. The host may be an information processing device capable of communicating with the storage device in the manner above, for example, a personal computer, a tablet computer, a server, a portable computer, a network switch, a router, a cellular phone, and a personal digital assistant, etc. The storage device 100 includes an interface 110, a control component 120, one or more NVM chips 130, and a Dynamic Random Access Memory (DRAM) 140.

An NAND flash, a phase change memory, a Ferroelectric RAM (FeRAM), a Magnetic Random Access Memory (MRAM), and a Resistive Random Access Memory (RRAM), etc. are common NVMs.

The interface 110 may be adapted to exchange data with the host in the ways such as an SATA, IDE, a USB, PCIE, NVMe, an SAS, the Ethernet, and a fiber channel.

The control component 120 is configured to control data transmission between the interface 110, the NVM chip 130, and the DRAM 140, and is also configured for storage management, mapping from the logical address of the host to the physical address of the flash, erasure equalization, and bad block management, etc. The control component 120 may be implemented in various ways including software, hardware, firmware, or a combination thereof. For example, the control component 120 may be implemented in the form such as a Field-Programmable Gate Array (FPGA), an Application Specific Integrated Circuit (ASIC), or a combination thereof. The control component 120 may also include a processor or a controller, in which software is executed to manipulate the hardware of the control component 120 to process an Input/Output (10) command. The control component 120 may also be coupled to the DRAM 140 and can access data of the DRAM 140. The DRAM can store an FTL table and/or cached 10 command data.

The control component 120 includes a flash interface controller (or referred to as a medium interface controller or a flash channel controller). The flash interface controller is coupled to the NVM chip 130 and issues a command to the NVM chip 130 in the manner of following the interface protocol of the NVM chip 130, to operate the NVM chip 130 and receive a command execution result output from the NVM chip 130. The known interface protocol of the NVM chip includes "Toggle", "ONFI", etc.

A memory target is one or more Logic UNits (LUNs) sharing a Chip Enable (CE) signal in a NAND flash package. The NAND flash package may include one or more dies. Typically, the LUN corresponds to a single die. The LUN may include a plurality of planes. The plurality of planes in the LUN may be accessed in parallel, and a plurality of LUNs in an NAND flash chip may execute commands and report statuses independently of each other. In the "Open NAND Flash Interface Specification (Revision 3.0)" available from http://www.micron.com/~/media/Documents/Products/Other%20Documents/ONFI3_0Gold.ashx, it provides meanings of the target, LUN and plane, which is a part of the prior art.

Data is generally stored in and read from a storage medium in pages, while data is erased in blocks. A block (also referred to as a physical block) includes a plurality of pages. A page (referred to as a physical page) on the storage medium has a fixed size, for example, 17664 bytes. The physical page may also have other sizes.

In a solid-state storage device, a Flash Translation Layer (FTL) is used to maintain mapping information from a logical address to a physical address. The logical address constitutes the storage space of the solid-state storage device perceived by upper-layer software such as an operating system. The physical address is an address used for accessing the physical storage unit of the solid-state storage device. In the related art, an intermediate address form may also be used to implement address mapping. For example, the logical address is mapped to an intermediate address, and then the intermediate address is further mapped to the physical address.

The table structure that stores the mapping information from the logical address to the physical address is referred to as an FTL table. The FTL table is important metadata in the solid-state storage device. Generally, the data items of the FTL table record an address mapping relationship in the solid-state storage device in units of data pages.

FIG. 2 shows a schematic diagram of a chunk. The chunk includes physical blocks from each of a plurality of LUNs (called a LUN group). Preferably, each LUN provides a physical block for the chunk. As an example, the chunk is constructed on every 16 LUNs. Each chunk includes 16 physical blocks, from each of the 16 LUNs. In the example of FIG. 2, chunk 0 includes physical block 0 from each of 16 LUNs, and chunk 1 includes physical block 1 from each LUN. The chunk may also be constructed in many other ways.

As an optional way, page stripes are constructed in chunks, and physical pages with the same physical address in each LUN constitute a "page stripe". In FIG. 2, physical page P0-0, physical page P0-1 . . . and physical page P0-$x$ form page stripe 0, where physical page P0-0, physical page P0-1 . . . physical page P0-14 are used to store user data, and physical page P0-15 is used to store check data calculated according to all pieces of user data in the stripe. Similarly, in FIG. 2, physical page P2-0, physical page P2-1 . . . and physical page P2-x form page stripe 2. Optionally, the physical page used to store the check data may be located anywhere in the page stripe.

When data is repeatedly written in the logical page, the FTL table entry records the correspondence between the logical page address and the latest physical page address, and the data recorded in the physical page address that has been written with data but is no longer referenced (for example, there is no record in the FTL table) becomes "garbage" (data). The data that has been written and referenced (for example, there are records in the FTL table) is called valid data, and "garbage" is called dirty data. The physical block containing dirty data is called a "dirty physical block", and the physical block that has not been written with data is called an "idle physical block".

A solid-state storage device performs a garbage collection (GC) process to collect invalid data. FIG. 3 shows a schematic diagram of the GC process. Physical block 0 and physical block 1 are written with data. Physical pages 310, 312, 314, and 316, etc. of physical block 0 indicated by a grid box are not recorded in the FTL table, and the data thereon is dirty data. Physical pages 330, 332, 334, and 336, etc. of physical block 0 indicated by blank boxes are recorded in the FTL table, and the data thereon is valid data. Data on physical pages 320, 322, 324, and 326, etc. of physical block 1 indicated by the grid box is dirty data. Data on physical pages 344, 342, 346, and 348 of physical block 1 indicated by the blank boxes are valid data. In FIG. 3, the data contained in the physical pages indicated by the grid is dirty data, and the data contained in the physical pages indicated by the blank box is valid data.

In order to perform GC, dirty physical blocks (for example, physical block 0 and physical block 1) are scanned, valid data therein is read and written to idle physical block 2, and changes in the physical page address of the valid data are recorded in the FTL table. After all pieces of valid data are moved to physical block 2, the scanned physical block 0 and physical block 1 are erased, so that physical block 0 and physical block 1 become idle physical blocks.

The solid-state storage device also implements a wear-leveling process, so that a plurality of physical blocks of a plurality of NVM chips of the solid-state storage device experience substantially the same number of erases.

FIG. 4 shows a schematic diagram of a GC method.

The dirty physical block collection records the dirty physical blocks of part or all of the NVM chips of the solid-state storage device. The idle physical block collection records the idle physical blocks of part or all of the NVM chips of the solid-state storage device.

To implement GC, a "GC" module (for example, implemented in a control component 120 or a CPU or controller therein) obtains dirty physical blocks from the dirty physical block collection, and obtains idle physical blocks from the idle physical block collection. The dirty physical blocks are scanned, and valid data therein is written into the idle physical blocks. After all pieces of valid data in the obtained dirty physical blocks are moved to the idle physical block, the dirty physical blocks are erased, and the erased physical blocks are recorded in the idle physical block collection.

The dirty physical block collection and the idle physical block collection may be a linked list, a linear list, or other data structures used to represent the collection. The addresses of the physical blocks are recorded in the collection to access the physical blocks.

Optionally, GC is implemented in the unit of chunk (instead of in the unit of physical block).

The storage device also performs the wear-leveling operation so that each physical block of the storage device experiences substantially the same number of erases during use, thereby reducing the adverse effect of the life span of individual physical blocks on the service life of the storage device.

SUMMARY

Due to the implementation of the GC and wear-leveling process, data is repeatedly written to the NVM chip, which increases the written amount of data and reduces the service life of the storage device. Moreover, the process of writing data to the NVM occupies the read/write bandwidth of the storage device, and may affect the performance experienced by the user. It is necessary to further improve the GC and wear-leveling process to reduce the extra written amount generated by the GC and wear-leveling process.

To achieve the foregoing objective, according to a first aspect of the present application, provided is a first method for selecting a data block to be collected in GC according to the first aspect of the present application, including: obtaining, according to a first selection policy, a first data block to be collected; determining, according to a first rejection policy, whether to refuse to collect of the first data block to be collected; and if it is determined according to the first rejection policy that collecting of the first data block to be collected is rejected, not performing GC on the first data block to be collected.

According to the first method for selecting a data block to be collected in GC in the first aspect of the present application, provided is a second method for selecting a data block to be collected in GC according to the first aspect of the present application, further including: if it is determined according to the first rejection policy that collect of the first data block to be collected is not rejected, performing GC on the first data block to be collected.

According to the first or second method for selecting a data block to be collected in GC in the first aspect of the present application, provided is a third method for selecting a data block to be collected in GC according to the first aspect of the present application, further including: obtaining, according to the first selection policy again, a second data block to be collected.

According to one of the first to third methods for selecting a data block to be collected in GC in the first aspect of the present application, provided is a fourth method for selecting a data block to be collected in GC according to the first aspect of the present application, where the first selection policy indicates that a dirty data block with the maximum amount of valid data is selected from the dirty data blocks of a storage device as a data block to be collected.

According to one of the first to fourth methods for selecting a data block to be collected in GC in the first aspect of the present application, provided is a fifth method for selecting a data block to be collected in GC according to the first aspect of the present application, where the first rejection policy indicates that a dirty data block with the amount of change of the valid data greater than a threshold, is rejected to be collected.

According to the fifth method for selecting a data block to be collected in GC in the first aspect of the present application, provided is a sixth method for selecting a data block to be collected in GC according to the first aspect of the present application, where the first rejection policy indicates that the dirty data block with the amount of change of the valid data greater than the threshold within a specified period of time, is rejected to be collected.

According to the fifth method for selecting a data block to be collected in GC in the first aspect of the present application, provided is a seventh method for selecting a data block to be collected in GC according to the first aspect of the present application, where the first rejection policy indicates that the dirty data block with a ratio of the valid data reduction amount to the valid data amount greater than the threshold, is rejected to be collected.

According to the fifth method for selecting a data block to be collected in GC in the first aspect of the present application, provided is an eighth method for selecting a data block to be collected in GC according to the first aspect of the present application, where the first rejection policy indicates that the dirty data block with the valid data reduction amount rank less than a threshold in all dirty data blocks, is rejected to be collected.

According to the fifth method for selecting a data block to be collected in GC in the first aspect of the present application, provided is a ninth method for selecting a data block to be collected in GC according to the first aspect of the present application, where if a ratio of the valid data reduction amount of the first data block to be collected to the total valid data reduction amount of all data blocks of the storage device is less than the threshold, the first rejection policy indicates that the first data block to be collected is rejected to be collected.

According to the fifth method for selecting a data block to be collected in GC in the first aspect of the present application, provided is a tenth method for selecting a data block to be collected in GC according to the first aspect of the present application, where if the rank of the ratio of the valid data reduction amount of the first data block to be collected to the total valid data reduction amount of all data blocks of the storage device in the ratios of the valid data reduction amount of the first data block to be collected to the total valid data reduction amount of all data blocks of the storage device in respective dirty data blocks is less than a threshold, the first rejection policy indicates that the first data block to be collected is rejected to be collected.

According to one of the first to tenth methods for selecting a data block to be collected in GC in the first aspect of the present application, provided is an eleventh method for selecting a data block to be collected in GC according to the first aspect of the present application, further including: obtaining, according to a second selection policy, a third data block to be collected; and determining, according to the first rejection policy, whether to refuse to collect of the third data block to be collected.

According to one of the first to eleventh methods for selecting a data block to be collected in GC in the first aspect of the present application, provided is a twelfth method for selecting a data block to be collected in GC according to the first aspect of the present application, further including: determining, according to the second rejection policy, whether to refuse to collect of the first data block to be collected.

According to the twelfth method for selecting a data block to be collected in GC in the first aspect of the present application, provided is a thirteenth method for selecting a data block to be collected in GC according to the first aspect of the present application, where the second rejection policy indicates that if the data stored in the first data block to be collected is hot data, the first data block to be collected is rejected to be collected.

According to the eleventh method for selecting a data block to be collected in GC in the first aspect of the present application, provided is a fourteenth method for selecting a data block to be collected in GC according to the first aspect of the present application, where the second selection policy indicates that the dirty data block with the maximum number of erases is selected from the dirty data blocks of the storage device as the data block to be collected.

According to one of the first to fourteenth methods for selecting a data block to be collected in GC in the first aspect of the present application, provided is a fifteenth method for selecting a data block to be collected in GC according to the first aspect of the present application, further including: selecting one or more of the first selection policy and the second selection policy to obtain the data block to be collected.

According to a second aspect of the present application, provided is a first method for selecting a data block to be collected in GC according to the second aspect of the present application, including: obtaining, according to a first selection policy, a data block to be collected; and if the data block to be collected is not obtained according to the first selection policy, then also obtaining, the data block to be collected according to a second selection policy.

According to the first method for selecting a data block to be collected in GC in the second aspect of the present application, provided is a second method for selecting a data block to be collected in GC according to the second aspect of the present application, where the first selection policy indicates that if there is currently cold data in the storage device, a dirty chunk with oldest data stored thereon is selected from a plurality of dirty chunks of the storage device as a chunk to be collected.

According to the second method for selecting a data block to be collected in GC in the second aspect of the present application, provided is a third method for selecting a data block to be collected in GC according to the second aspect of the present application, where whether there is currently cold data in the storage device is identified according to a value of a cold data counter.

According to one of the first to third methods for selecting a data block to be collected in GC in the second aspect of the present application, provided is a fourth method for selecting a data block to be collected in GC according to the second aspect of the present application, where the second selection policy indicates that a dirty data block with the maximum amount of valid data is selected from the dirty data blocks of the storage device as a data block to be collected.

According to one of the first to fourth methods for selecting a data block to be collected in GC in the second aspect of the present application, provided is a fifth method for selecting a data block to be collected in GC according to the second aspect of the present application, further including: collecting valid data of the data block to be collected; and if the data block to be collected is set with a cold data tag, and the number of erases of the data block to be collected is less than a threshold of the number of erases, incrementing the cold data counter.

According to the fifth method for selecting a data block to be collected in GC in the second aspect of the present application, provided is a sixth method for selecting a data block to be collected in GC according to the second aspect of the present application, further including: if the data block to be collected is set with the cold data tag, and the number of erases of the data block to be collected is not less than the threshold of the number of erases, decrementing the cold data counter.

According to the fifth or sixth method for selecting a data block to be collected in GC in the second aspect of the present application, provided is a seventh method for selecting a data block to be collected in GC according to the second aspect of the present application, where the average number of erases of all chunks of the storage device or the average number of erases of all dirty chunks of the storage device is taken as the threshold of the number of erases.

According to one of the first to seventh methods for selecting a data block to be collected in GC in the second aspect of the present application, provided is an eighth method for selecting a data block to be collected in GC according to the second aspect of the present application, further including: writing valid data of the data block to be collected into an idle data block; and if the data block to be collected is set with a cold data tag, also setting the cold data tag in the idle data block.

According to the eighth method for selecting a data block to be collected in GC in the second aspect of the present application, provided is a ninth method for selecting a data block to be collected in GC according to the second aspect of the present application, where if the data block to be collected is set with the cold data tag, and the cold data counter is greater than a specified threshold, the cold data tag is also set in the idle data block.

According to the ninth method for selecting a data block to be collected in GC in the second aspect of the present application, provided is a tenth method for selecting a data block to be collected in GC according to the second aspect of the present application, where if the data block to be collected is set with the cold data tag, and the cold data counter is not greater than the specified threshold, the cold data tag is not set in the idle data block.

To achieve the foregoing objective, according to a third aspect of the present application, provided is a first garbage data collection method according to the third aspect of the present application, including: obtaining data written by a user and/or data collected from a dirty chunk; generating a write request indicating to write the data into an idle chunk; and writing the data into the idle chunk according to the write request.

According to the first garbage data collection method in the third aspect of the present application, provided is a second garbage data collection method according to the third aspect of the present application, further including: erasing the dirty chunk; and releasing the dirty chunk, and recording the dirty chunk in an idle chunk set.

According to the first or second garbage data collection method in the third aspect of the present application, provided is a third garbage data collection method according to the third aspect of the present application, where the idle chunk is obtained from the idle chunk set.

According to the first to third garbage data collection methods in the third aspect of the present application, provided is a fourth garbage data collection method according to the third aspect of the present application, where the idle chunk is an idle chunk with the least number of erasing in the idle chunk set.

According to the first to third garbage data collection methods in the third aspect of the present application, provided is a fifth garbage data collection method according to the third aspect of the present application, where the idle chunk is an idle chunk in the idle chunk set that is first added to the idle chunk set.

According to the first to fifth garbage data collection methods in the third aspect of the present application, provided is a sixth garbage data collection method according to the third aspect of the present application, where the data written by the user comes from at least one stream, and each stream includes data written by users accessing the same namespace.

According to the first to fifth garbage data collection methods in the third aspect of the present application, provided is a seventh garbage data collection method according to the third aspect of the present application, where the data written by the user comes from a plurality of streams, and each stream includes data written by users with the same stream tag.

According to the first to fifth garbage data collection methods in the third aspect of the present application, provided is an eighth garbage data collection method according to the third aspect of the present application, where the data written by the user comes from a plurality of streams, and each stream includes data written by users from the same application and/or virtual machine.

According to the first to eighth garbage data collection methods in the third aspect of the present application, provided is a ninth garbage data collection method according to the third aspect of the present application, where the data collected from the dirty chunk constitutes a GC data stream.

According to the first to ninth garbage data collection methods in the third aspect of the present application, provided is a tenth garbage data collection method according to the third aspect of the present application, where dirty chunk is obtained from a dirty chunk set.

According to the tenth garbage data collection method in the third aspect of the present application, provided is an eleventh garbage data collection method according to the third aspect of the present application, where one of a plurality of policies is selected to obtain the dirty chunk from the dirty chunk set.

According to the eleventh garbage data collection method in the third aspect of the present application, provided is a twelfth garbage data collection method according to the third aspect of the present application, where a first policy in the plurality of policies is to select a dirty chunk with the least number of erases from the dirty chunk set.

According to the twelfth garbage data collection method in the third aspect of the present application, provided is a thirteenth garbage data collection method according to the third aspect of the present application, where the dirty chunk includes a plurality of dirty physical blocks, and the number of erases is an average number of erases or a total number of erases of all the dirty physical blocks constituting the dirty chunk.

According to the twelfth or thirteenth garbage data collection method in the third aspect of the present application, provided is a fourteenth garbage data collection method according to the third aspect of the present application, where a second policy in the plurality of policies is to select the oldest dirty chunk from the dirty chunk set.

According to the fourteenth garbage data collection method in the third aspect of the present application, provided is a fifteenth garbage data collection method according to the third aspect of the present application, where the age is the interval between the start time or end time when data is written into the dirty chunk and the current time, or an average value of the intervals between the time when each piece of data recorded on the dirty chunk is written and the current time.

According to the twelfth to fifteenth garbage data collection methods in the third aspect of the present application, provided is a sixteenth garbage data collection method according to the third aspect of the present application, where a third policy in the plurality of policies is to select a dirty chunk having highest priority from the dirty chunk set.

According to the sixteenth garbage data collection method in the third aspect of the present application, provided is a seventeenth garbage data collection method according to the third aspect of the present application, where the priority is a function of the valid data amount of the dirty chunk and the number of erases of the dirty chunk, or the priority is a function of the valid data amount of the dirty chunk and the difference between the number of erases of the dirty chunk and the average number of erases.

According to the sixteenth or seventeenth garbage data collection method in the third aspect of the present application, provided is an eighteenth garbage data collection method according to the third aspect of the present application, where the first selection policy, the second selection policy, and the third selection policy are selected in turn to select a dirty chunk from the dirty chunk set.

According to the sixteenth to eighteenth garbage data collection methods in the third aspect of the present application, provided is a nineteenth garbage data collection method according to the third aspect of the present application, where a selection policy is selected from the first selection policy, the second selection policy, and the third selection policy in a weighted round-robin manner to select a dirty chunk from the dirty chunk set.

According to the sixteenth garbage data collection method in the third aspect of the present application, provided is a twentieth garbage data collection method according to the third aspect of the present application, where one of the first policy, the second policy, and the third policy is selected according to a specified condition to select a dirty chunk from the dirty chunk set.

According to the first to twentieth garbage data collection methods in the third aspect of the present application, provided is a twenty-first garbage data collection method according to the third aspect of the present application, where the data written by the user is written into a first idle chunk, and the data collected from the dirty chunk is written into a second idle chunk.

According to the twenty-first garbage data collection method in the third aspect of the present application, provided is a twenty-second garbage data collection method according to the third aspect of the present application, where in response to the first idle chunk being filled with data, a new first idle chunk is obtained from the idle chunk set.

According to the twenty-first and twenty-second garbage data collection methods in the third aspect of the present application, provided is a twenty-third garbage data collection method according to the third aspect of the present application, where in response to initiating a GC operation, a second idle chunk is obtained from the idle chunk set.

According to the twenty-first to twenty-third garbage data collection methods in the third aspect of the present application, provided is a twenty-fourth garbage data collection method according to the third aspect of the present application, where in response to the number of idle chunks in the idle chunk set being lower than a first threshold, the GC operation is initiated.

According to the twenty-first to twenty-fourth garbage data collection methods in the third aspect of the present application, provided is a twenty-fifth garbage data collection method according to the third aspect of the present application, where an idle chunk with the least number of erases is obtained from the idle chunk set as the first idle chunk; and/or an idle chunk with the maximum number of erases or the number of erases greater than a second threshold is obtained from the idle chunk set as the second idle chunk.

According to the twenty-fifth garbage data collection method in the third aspect of the present application, provided is a twenty-sixth garbage data collection method according to the third aspect of the present application, where if there is no idle chunk with the number of erases greater than the second threshold in the idle chunk set, the idle chunk with the maximum number of erases is selected as the second idle chunk, or the idle chunk with the difference between the number of erases and the average number of erases of the idle chunk set less than a third threshold is selected as the second idle chunk.

According to the twenty-first to twenty-sixth garbage data collection methods in the third aspect of the present application, provided is a twenty-seventh garbage data collection method according to the third aspect of the present application, where in response to the number of erases of the second idle chunk being greater than the third threshold, a dirty chunk with the least number of erases and/or the oldest dirty chunk is selected from the dirty chunk set as the dirty chunk.

According to the twenty-first to twenty-seventh garbage data collection methods in the third aspect of the present application, provided is a twenty-eighth garbage data collection method according to the third aspect of the present application, where in response to the number of erases of the second idle chunk being greater than the third threshold, if the data collected from the dirty chunk is cold data, then the data collected from the dirty chunk is written into the second idle chunk.

According to the twenty-eighth garbage data collection method in the third aspect of the present application, provided is a twenty-ninth garbage data collection method according to the third aspect of the present application, where in response to the number of erases of the second idle chunk being greater than the third threshold, if the data collected from the dirty chunk is not cold data, then the data collected from the dirty chunk is written into the first idle chunk.

According to the eighteenth to twenty-sixth garbage data collection methods in the third aspect of the present application, provided is a thirtieth garbage data collection method according to the third aspect of the present application, where in response to the age of the oldest dirty chunk in the dirty chunk set exceeds a fourth threshold, the second policy is first used to select the dirty chunk from the dirty chunk set.

According to the eighteenth to twenty-sixth and thirtieth garbage data collection methods in the third aspect of the present application, provided is a thirty-first garbage data collection method according to the third aspect of the present application, where periodically or in response to a user's instruction, the first policy or the second policy is first used to select the dirty chunk from the dirty chunk set.

According to the twenty-first to thirty-first garbage data collection methods in the third aspect of the present application, provided is a thirty-second garbage data collection method according to the third aspect of the present application, where the data written by the user and the data collected from the dirty chunk are written into the first idle chunk and the second idle chunk in different ways.

According to the thirty-second garbage data collection method in the third aspect of the present application, provided is a thirty-third garbage data collection method according to the third aspect of the present application, where if the number of erases of the second idle chunk is less than a fifth threshold or the number of erases of the second idle chunk is less than the difference between the average number of erases of the idle chunk set and the predetermined number, then the data collected from the dirty chunk is written into the second idle chunk.

According to the thirty-second or thirty-third garbage data collection method in the third aspect of the present application, provided is a thirty-fourth garbage data collection method according to the third aspect of the present application, where if the number of erases of the second idle chunk is greater than a sixth threshold or the number of erases of the second idle chunk is greater than the difference between the average number of erases of the idle chunk set and the predetermined number, then it is determined whether the data collected from the dirty chunk is cold data; if yes, the data collected from the dirty chunk is written into the second idle chunk; otherwise, the data collected from the dirty chunk is written into the first idle chunk According to the thirty-second garbage data collection method in the third aspect of the present application, provided is a thirty-fifth garbage data collection method according to the third aspect of the present application, where it is determined whether the data collected from the dirty chunk is cold data; if yes, it is determined whether the number of erases of the second idle chunk is greater than the fifth threshold or whether the number of erases of the second idle chunk is greater than the difference between the average number of erases of the idle chunk set and the predetermined number; if yes, the data collected from the dirty chunk is written into the second idle chunk; if the write data of the GC interface is not cold data, the data collected from the dirty chunk is written into the first idle chunk.

According to the thirty-fourth or thirty-fifth garbage data collection method in the third aspect of the present application, provided is a thirty-sixth garbage data collection method according to the third aspect of the present application, where the data with the age greater than a seventh threshold is identified as cold data.

According to the thirty-fourth or thirty-fifth garbage data collection method in the third aspect of the present application, provided is a thirty-seventh garbage data collection method according to the third aspect of the present application, where the data collected from the dirty chunk is identified as cold data.

According to the thirty-fourth or thirty-fifth garbage data collection method in the third aspect of the present application, provided is a thirty-eighth garbage data collection method according to the third aspect of the present application, where whether the data is cold data is identified according to a storage identifier associated with the data collected from the dirty chunk.

According to the first to thirty-eighth garbage data collection methods in the third aspect of the present application, provided is a thirty-ninth garbage data collection method according to the third aspect of the present application, where the bandwidths for obtaining the data written by the user and the data collected from the dirty chunk are controlled.

According to the thirty-ninth garbage data collection method in the third aspect of the present application, provided is a fortieth garbage data collection method according to the third aspect of the present application, where according to the specified ratio, the bandwidths are allocated for obtaining the data written by the user and the data collected from the dirty chunk.

According to the thirty-ninth garbage data collection method in the third aspect of the present application, provided is a forty-first garbage data collection method according to the third aspect of the present application, where if there is no data collected from the dirty chunk, all bandwidths are allocated for obtaining the data written by the user; and if there is data collected from the dirty chunk, a predetermined range of bandwidths is allocated for obtaining the data collected from the dirty chunk.

According to the thirty-ninth garbage data collection method in the third aspect of the present application, provided is a forty-second garbage data collection method according to the third aspect of the present application, where the amount of obtained data written by the user is in a specified proportion to the amount of obtained data collected from the dirty chunk.

According to the thirty-ninth to forty-second garbage data collection methods in the third aspect of the present application, provided is a forty-third garbage data collection method according to the third aspect of the present application, where if the number of idle chunks in the idle chunk set is less than an eighth threshold, the bandwidth allocated for obtaining the data collected from the dirty chunk is increased.

According to the thirty-ninth to forty-third garbage data collection methods in the third aspect of the present application, provided is a forty-fourth garbage data collection method according to the third aspect of the present application, where the bandwidth allocated for obtaining the data written by the user having priority is increased, while maintaining the bandwidth allocated for obtaining the data collected from the dirty chunk.

According to the first to forty-fourth garbage data collection methods in the third aspect of the present application, provided is a forty-fifth garbage data collection method according to the third aspect of the present application, where the bandwidths of writing the data written by the user into the idle chunk and the data collected from the dirty chunk into the idle chunk are controlled.

According to the forty-fifth garbage data collection method in the third aspect of the present application, provided is a forty-sixth garbage data collection method according to the third aspect of the present application, where according to the specified ratio, the bandwidths are allocated for writing the data written by the user into the idle chunk and the data collected from the dirty chunk into the idle chunk.

According to the forty-fifth garbage data collection method in the third aspect of the present application, provided is a forty-seventh garbage data collection method according to the third aspect of the present application, where if there is no data collected from the dirty chunk, all bandwidths are allocated for obtaining the data written by the user into the idle chunk; and if there is data collected from the dirty chunk, a predetermined range of bandwidths is allocated for obtaining the data collected from the dirty chunk into the idle chunk.

According to the forty-fifth garbage data collection method in the third aspect of the present application, provided is a forty-eighth garbage data collection method according to the third aspect of the present application, where the amount of data written by the user that is written into the idle chunk is in a specific proportion to the amount of data collected from the dirty chunk that is written into the idle chunk.

According to the forty-fifth to forty-eighth garbage data collection methods in the third aspect of the present application, provided is forty-ninth garbage data collection method according to the third aspect of the present application, where if the number of idle chunks in the idle chunk set is less than a ninth threshold, the bandwidth allocated for writing the data collected from the dirty chunk into the idle chunk is increased.

According to the forty-fifth to forty-ninth garbage data collection methods in the third aspect of the present application, provided is a fiftieth garbage data collection method according to the third aspect of the present application, where the bandwidth allocated for writing the data written by the user having priority into the idle chunk is increased, while maintaining the bandwidth allocated for writing the data collected from the dirty chunk into the idle chunk.

According to a fourth aspect of the present application, provided is a first solid-state storage device according to the fourth aspect of the present application, including a control component and a non-volatile memory chip, where the control component is configured to execute one of the garbage data collection methods provided by the first aspect, the second aspect or the third aspect of the present application.

According to the fourth aspect of the present application, provided is a first storage device having a program stored thereon according to the fourth aspect of the present application, where in response to the program being loaded into a processor to run, the program causes the processor to execute one of the garbage data collection methods provided by the first aspect, the second aspect or the third aspect of the present application.

The beneficial effects achieved by the present application include but are not limited to the following contents:

(1) embodiments of the present application reduces the write amplification introduced in the GC process;

(2) the embodiments of the present application reduce the impact of the GC process on user IO performance;

(3) the embodiments of the present application determines whether the GC data is stored in the idle chunk configured to store GC according to the number of erases of the data written in the GC operation and the nature of the data, so as to facilitate GC and wear-leveling; and (4) the embodiments of the present application adopt a bandwidth controller to control the bandwidth for obtaining the data written by the user and obtaining the GC data, and/or control the bandwidth for writing the data written by the user into the idle chunk and writing the GC data into the idle chunk, which is conducive to GC and wear-leveling.

BRIEF DESCRIPTION OF THE DRAWINGS

To illustrate the technical solutions in embodiments of the present application or the prior art more clearly, the drawings used in the description of the embodiments or the prior art are briefly described below. Apparently, the drawings in the following description are only some embodiments of the present application, and a person skilled in the art can also obtain other drawings according to these drawings.

DETAILED DESCRIPTION

The technical solutions in the embodiments of the present application are clearly and completely described below with reference to the drawings in the embodiments of the present application. Apparently, the described embodiments are only a part of the embodiments of the present application, but not all embodiments. All other embodiments obtained by a person skilled in the art based on the embodiments of the present application without involving an inventive effort are within the scope of protection of the present application.

Figure 1:
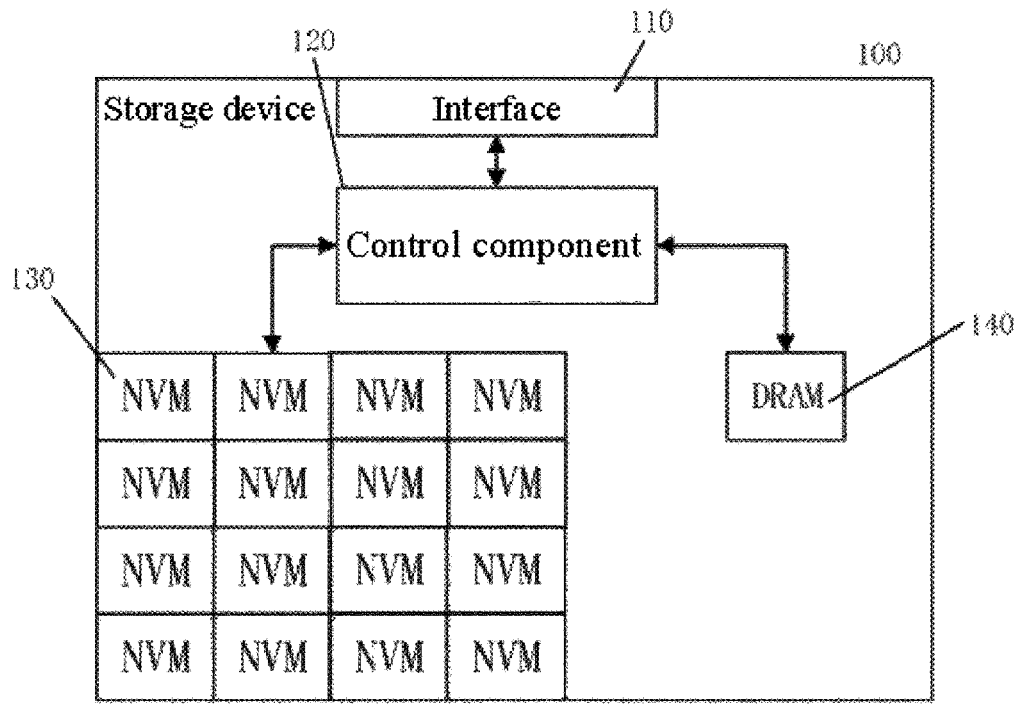
FIG. 1 is a block diagram of a storage device.
Figure 2:
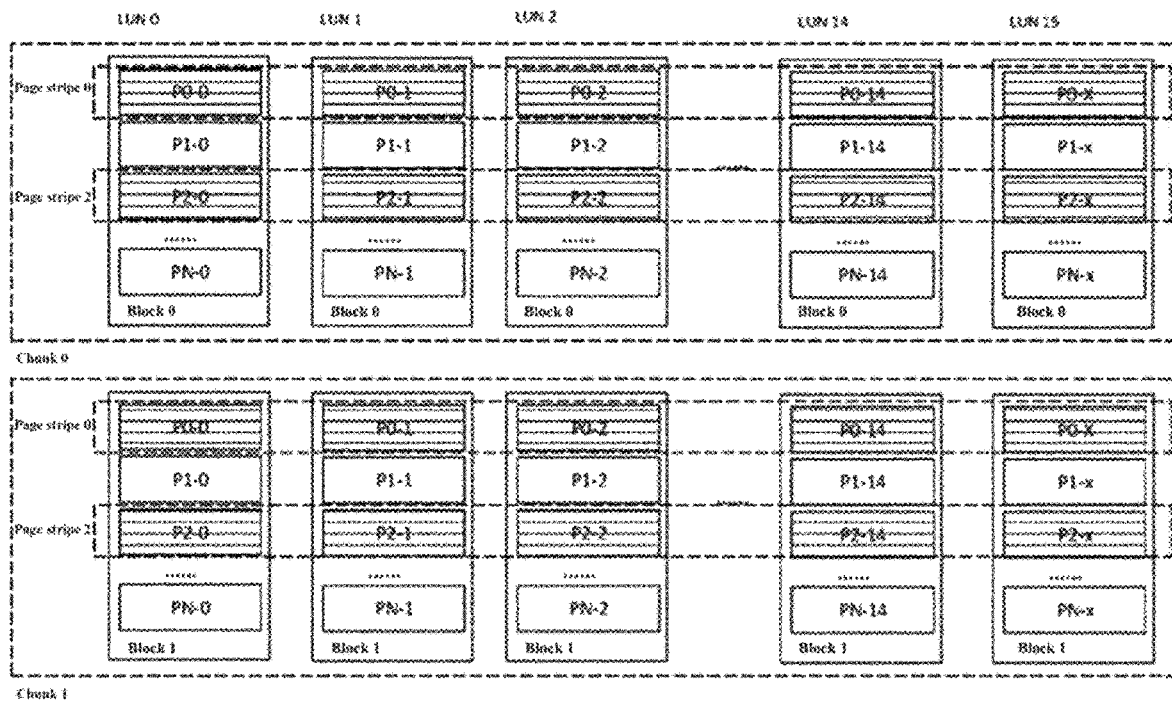
FIG. 2 is a schematic diagram of a chunk.
Figure 3:
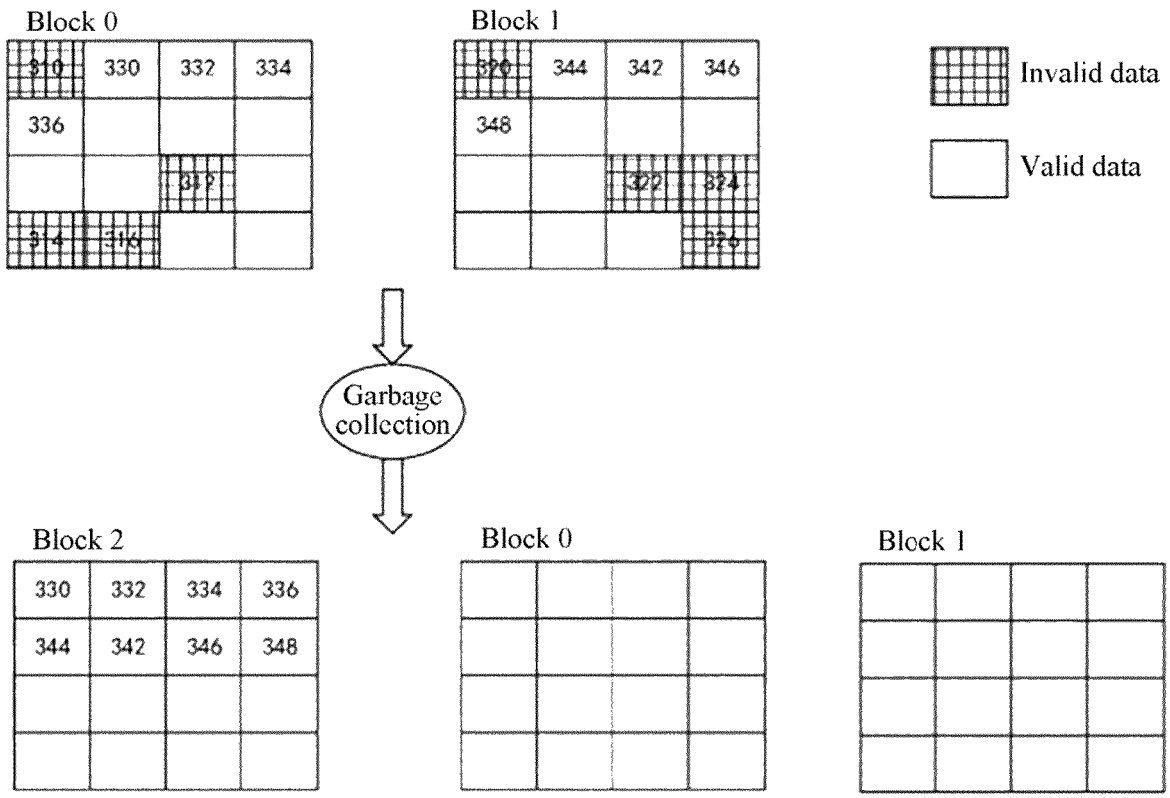
FIG. 3 is a schematic diagram of a GC process in the prior art.
Figure 4:
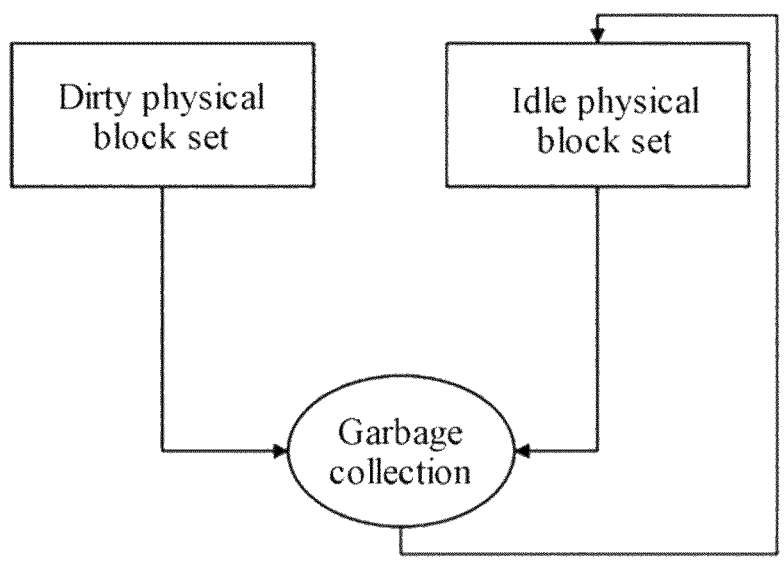
FIG. 4 is a schematic diagram of a GC method in the prior art.
Figure 5:
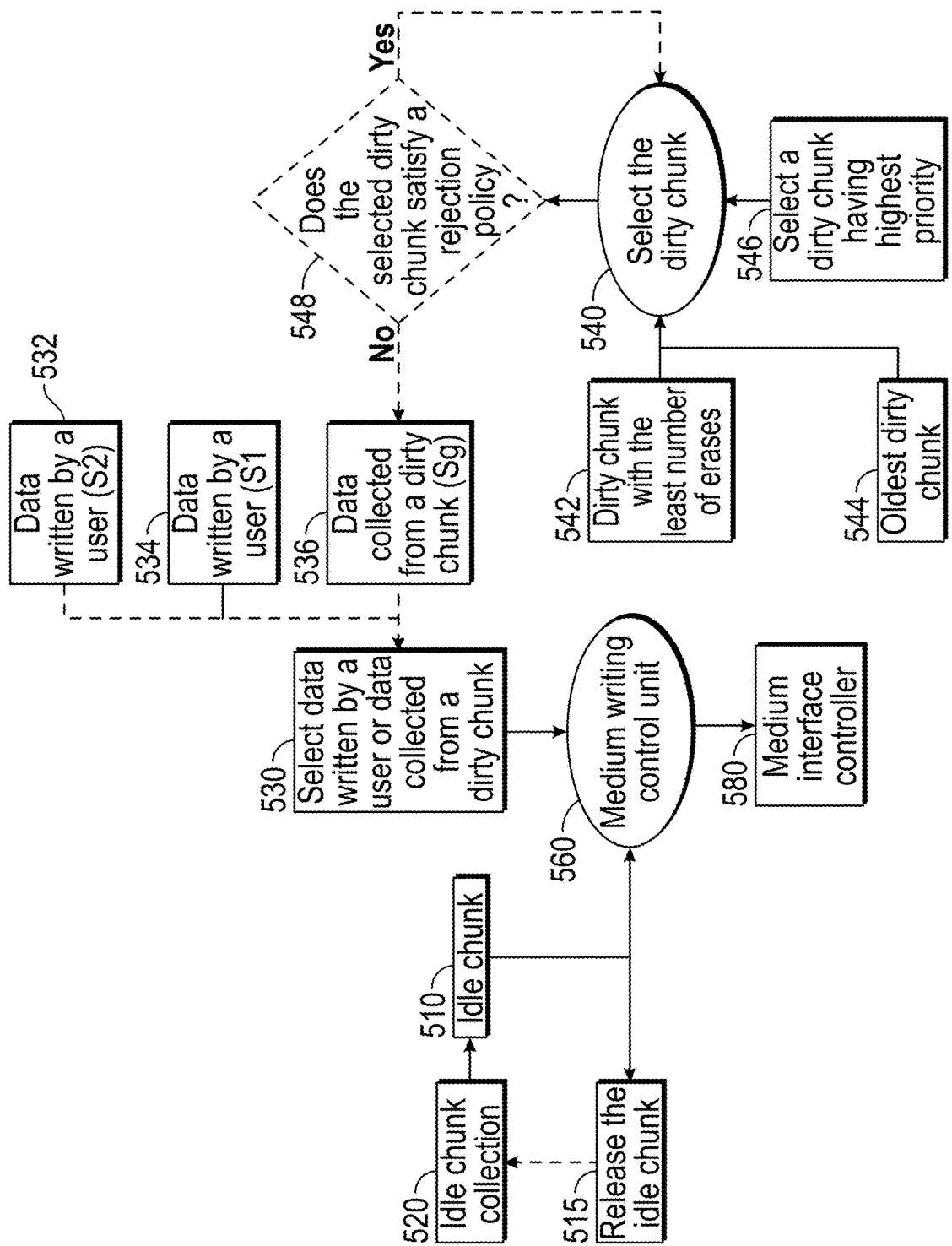
FIG. 5 is a schematic diagram of a garbage data collection process according to an embodiment of the present application.

FIG. 5 is a schematic diagram of a garbage data collection process according to an embodiment of the present application.

In this embodiment, the idle chunk 510 is a chunk into which data is to be or is being written. The data written into the idle chunk 510 is the data to be written (532, 534) by user IO requests or the data (536) collected from the dirty chunk in the GC operation. The data collected from the dirty chunk is the data to be collected obtained from the dirty chunk. Since the data written into the idle chunk 510 has a plurality of sources, the data to be written (532, 534) by the user IO requests or the data (536) collected from the dirty chunk in the GC operation is selected (530) to obtain the data to be written into the idle chunk 510.

A medium writing control unit 560 writes the data written by the user or the data collected from the dirty chunk into the idle chunk 510, for example, the data is written into an NVM chip, such as, an NAND flash memory, by sending a write request to a medium interface controller 580.

The dirty chunks that have completed the valid data collection are erased and released as idle chunks (515). The released idle chunks are recorded in an idle chunk set 520.

The idle chunks (510) are obtained from the idle chunk set 520, and used to carry the data to be written from the user or GC operation. As an example, the idle chunks in the idle chunk set 520 are sorted according to the number of erases. When the idle chunk 510 is obtained from the idle chunk set 520, the idle chunk with the least number of erases is selected. As another example, the idle chunks in the idle chunk set 520 are sorted according to the order in which the idle chunks are added to the idle chunk set 520. When the idle chunks 510 are obtained from the idle chunk set 520, the idle chunk that is added to the idle chunk set 520 earliest is selected. There are many other ways to select idle chunks from the idle chunk set 520.

Optionally, the data written by the user comes from at least one stream. For example, data of a user write request accessing each namespace constitutes a stream; or according to a stream tag of the user write request, data of a user write request with the same stream tag constitutes a stream; or according to an application or virtual machine that issues a user write request, data of a user write request from the same application and/or virtual machine constitutes a stream. In FIG. 5, reference numeral 534 indicates data to be written by a user IO belonging to stream S1. Optionally, reference numeral 532 indicates data to be written by a user IO belonging to stream S2. The data to be written in the GC operation is also regarded as a stream (Sg), which is indicated by reference numeral 536 in FIG. 5.

There are a plurality of dirty chunks in the dirty chunk set. According to the embodiments of the present application, a variety of policies are used to select dirty chunks to be collected in the GC process. For example, the policy 542 indicates to select the dirty chunk with the least number of erases, the policy 544 indicates to select the oldest dirty chunk, and the policy 546 indicates to select the dirty chunk having highest priority.

Optionally, the number of erases of the dirty chunk is the average number of erases or the total number of erases of all physical blocks constituting the dirty chunk. Still optionally, the age of the dirty chunk refers to the interval between the time when the data is written and the current time, or the average value between the time when each piece of data recorded on it is written and the current time. Still optionally, the dirty chunk with a low number of erases and a low valid data amount (or a low proportion of valid data amount) has high priority. For example, the priority is a function of the valid data amount of the dirty chunk and the number of erases of the dirty chunk. According to the number of erases (or the difference between the number of erases and the average number of erases) and the valid data amount of the dirty chunk, the priority P is obtained. Optionally, the priority (P) of the dirty chunk is a function of the number of erases of the dirty chunk or the difference between the number of erases of the dirty chunk and the average number of erases of all the dirty chunks in the dirty chunk set (annotated as $\Delta PE$) and the valid data amount of the dirty chunk (annotated as V), that is, $P=f(\Delta PE, V)$. In another example, $P=f(PE,V)+r$, where r is a random number.

One of the policies is selected to select dirty chunks to be collected (540). For example, the policy 542, the policy 544, and the policy 546 are selected in turn as the policy for selecting the blocks to be collected. As another example, each policy has a different weight, and one of the policy 542, the policy 544, and the policy 546 is selected in a weighted round-robin manner. As yet another example, the selection of policy is related to the occurrence of specified conditions. For example, in response to the number of erases of the idle chunk 510 being too large, the policy 542 is selected to select the dirty chunk. For another example, in response to the age of the oldest dirty chunk exceeding the threshold, the priority of the policy 544 is temporarily improved.

In an alternative embodiment, for the dirty chunk selected in step 540, it is further determined whether the selected dirty chunk satisfies a rejection policy (548). If the selected dirty chunk is rejected according to the rejection policy, the process returns to step 540 to select the dirty chunk again. If the selected dirty chunk is not rejected according to the rejection policy, the valid data in the selected dirty chunk forms a GC data stream (Sg) (536), and the GC is performed.

There are one or more rejection policies. In one example, the rejection policy R1 identifies changes in the valid data amount in the dirty chunks, and rejects the dirty chunks with excessive changes in the valid data amount. The change in the valid data amount is, for example, the valid data reduction amount of the selected dirty chunk within a specified period of time, or the ratio of the valid data reduction amount to the total valid data amount of the dirty chunk. Optionally, the change in the valid data amount is the valid data reduction amount of the dirty chunk, or the ratio of the valid data reduction amount to the total valid data amount of the dirty chunk when the dirty chunk is selected in step 540 twice consecutively. Still optionally, the change in the valid data amount is the ratio of the valid data reduction amount of the selected dirty chunk within the specified period of time to the valid data reduction amount in the storage device within the specified period of time. The valid data reduction amount in the storage device within the specified period of time can also be represented by the amount of data written by write commands received by the storage device within the specified period of time.

In yet another example, the rejection policy R2 identifies whether the valid data in the dirty chunk is cold data, and rejects to collect of the cold data under some specified conditions. For example, when data from the GC data stream (Sg) is written into an idle chunk, the data recorded on the idle chunk is annotated as cold data. The specified conditions for rejecting to collect of the cold data include, for example, the specified counter is less than a threshold, or the number of idle chunks in the idle chunk set is too few. In still another example, the rejection policy R2 identifies whether the valid data in the dirty chunk is hot data, and rejects to collect of the hot data under some specified conditions.

Optionally, in step 548, a plurality of rejection policies are used in a combined manner to determine whether to reject the selected dirty chunk.

Still optionally, the priority (P) of the dirty chunk indicated by the policy 546 considers the change in the valid data of the dirty chunk. Dirty chunks with large changes in valid data are given a lower priority, and dirty chunks with relatively small changes in valid data are given a relatively higher priority. For example, priority $P=f(PE, \Delta PE, V, \Delta V)+r$, where PE is the number of erases of the dirty chunk, $\Delta PE$ is the difference between the number of erasing the dirty chunk and the average number of erases of all the dirty chunks in the dirty chunk set, V is the valid data amount of the dirty chunk, $\Delta V$ is the amount of change of the valid data amount of the dirty chunk within a specified period of time, and r is a random number.

Still optionally, after considering the change in the valid data of the dirty chunk in the policy 546, step 548 is omitted. Moreover, optionally, step 548 is still implemented, and other rejection policies that are not related to the change in the valid data of the dirty chunk are applied in step 548.

Figure 6:
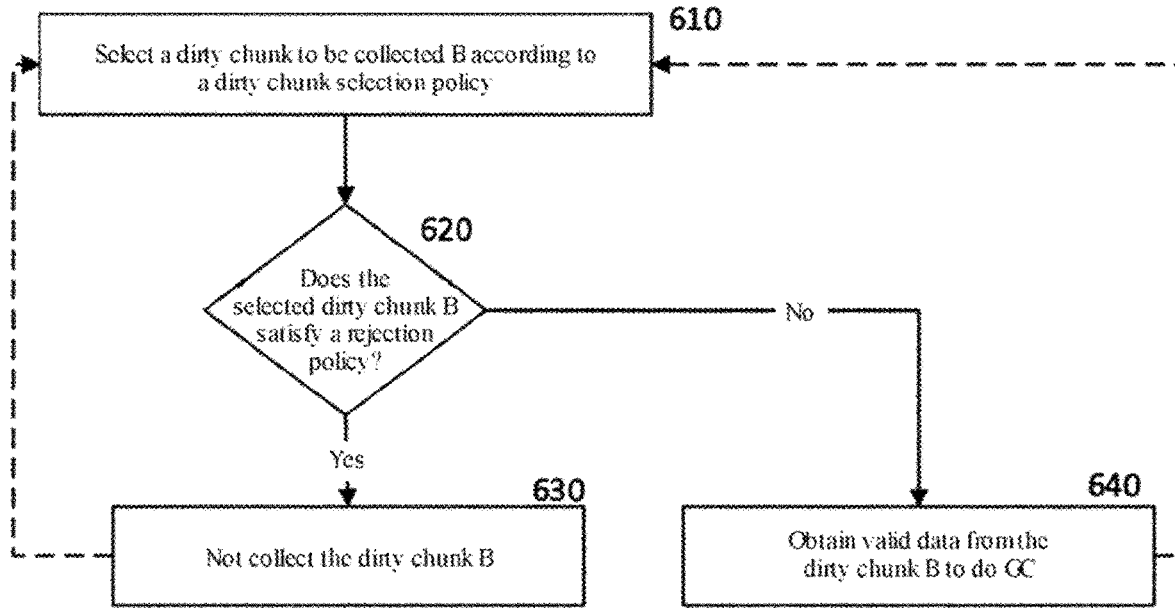
FIG. 6 is a flowchart for selection of a dirty chunk in GC according to an embodiment of the present application.

FIG. 6 is a flowchart for selection of a dirty chunk in GC according to an embodiment of the present application.

In order to perform GC, the dirty chunk to be collected is selected from the storage device. The policy used is selected from a plurality of policies for selecting dirty chunks (refer to FIG. 5, policies 542, 544 and 546), and the dirty chunks to be collected (annotated as dirty chunk B) is further selected according to the selected policy (610).

A rejection policy is applied to the dirty chunk B, and it is determined whether the dirty chunk B satisfies the rejection policy (620). If the dirty chunk B satisfies the rejection policy, collection is not performed on the dirty chunk B (630). If the dirty chunk B does not satisfy the rejection policy, GC is performed on the dirty chunk B (640). Moreover, the process returns to step 610 to start the next round of selection of dirty chunks to be collected. Although collect of the dirty chunk B is rejected in step 630, it does not mean that GC will never be performed on the dirty chunk, but in the next round or subsequent selection of dirty chunks, the dirty chunk is selected still according to the policy of selecting dirty chunks, and the dirty chunk B may be selected again.

Figure 7:
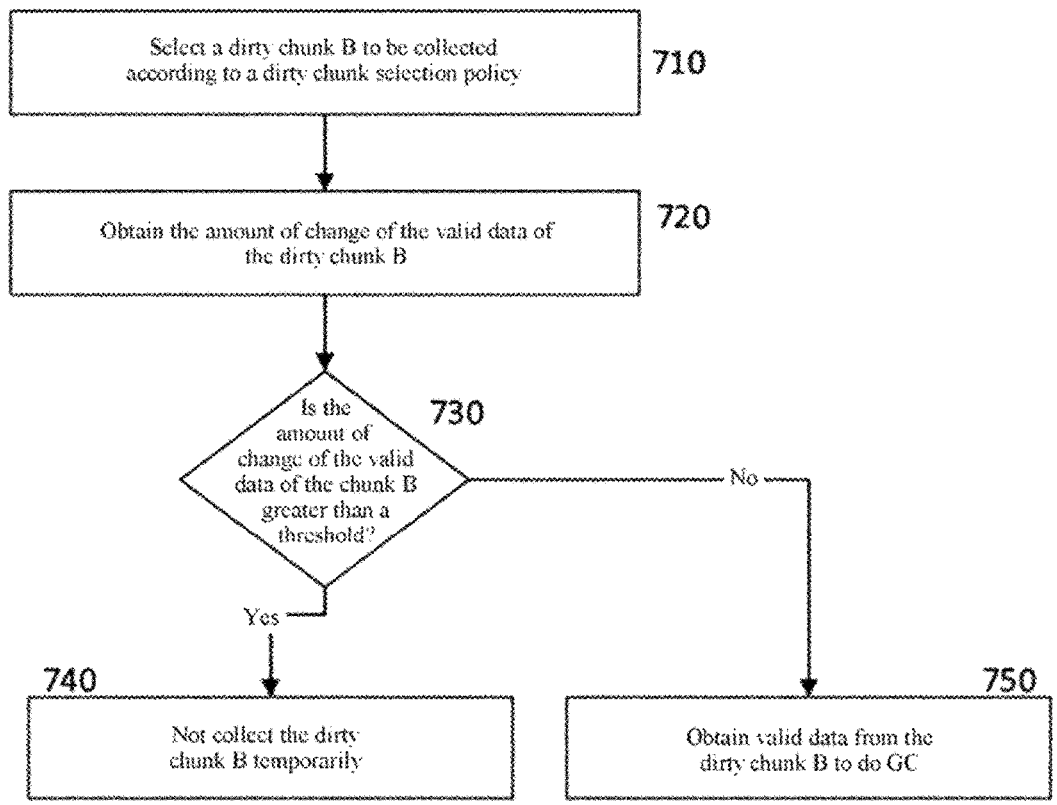
FIG. 7 is a flowchart for selection of a dirty chunk in GC according to another embodiment of the present application.

FIG. 7 is a flowchart for selection of a dirty chunk in GC according to another embodiment of the present application.

In order to perform GC, the dirty chunk to be collected is selected from the storage device. The policy used is selected from a plurality of policies for selecting dirty chunks (refer to FIG. 5, policies 542, 544 and 546), and the dirty chunks to be collected (annotated as dirty chunk B) is further selected according to the selected policy (710).

The amount of change of the valid data of chunk B is obtained (720). As an example, the valid data amount for each chunk or each dirty chunk is recorded or maintained. For example, the valid data amount of the idle chunk is 0, and in response to data being written into the chunk, the valid data amount thereof increases according to the amount of data written. In response to the valid data on the chunk becoming dirty data, the valid data amount thereof is correspondingly reduced.

As an example, in response to receiving a write command from the user, the storage device accesses an FTL table according to a logical address indicated by the write command. If a physical address corresponding to the logical address of the write command is recorded in the FTL table, the chunk having the physical address is obtained according to the physical address, and the amount of valid data recorded for the chunk is reduced. As yet another example, in response to receiving a write command from the user, the storage device traverses the chunks according to the logical address accessed by the write command to learn which chunk records the valid data corresponding to the accessed logical address, reducing the amount of valid data in the chunk that records the valid data corresponding to the accessed logical address, and the data corresponding to the logical address that should be accessed is also annotated as invalid data for the chunk.

In order to obtain the amount of change of the valid data of the chunk, in addition to recording the current valid data amount of the chunk, the previous valid data amount of the chunk is also recorded. For example, the current valid data amount is periodically backed up for each chunk or dirty chunk, and amount of change of the valid data of the chunk is obtained by comparing the difference between the current valid data amount of the chunk and the backup valid data amount. As yet another example, the valid data amount reduced by the user's write command in one cycle is periodically maintained for each chunk or dirty chunk. As still another example, whenever a dirty chunk is accessed for GC, the current valid data amount is backed up.

Optionally or furthermore, the total amount of valid data reduction in the storage device within a specified period of time is also recorded.

In step 730, it is determined whether the amount of change of the valid data of the chunk B exceeds a specified threshold, as a rejection policy for the chunk B to be collected. According to the embodiments of the present application, the dirty chunks with excessive changes in valid data is rejected to be collected. A large amount of change of the valid data of the dirty chunk means that the dirty chunk is being updated frequently by the user. It is hoped that the GC of the dirty chunk is postponed in order to expect more data on the dirty chunk to become invalid data, so as to validly reduce write amplification caused by the collect of valid data in the GC process.

Optionally, as a rejection policy for the chunk B to be collected, it is determined whether the ratio of the valid data reduction amount of the dirty chunk B to the total amount of valid data of the dirty chunk B is greater than a threshold. Still optionally, it is determined whether the ratio of the valid data reduction amount of the dirty chunk B to the valid data reduction amount in the storage device is greater than the threshold. Still optionally, it is determined whether the valid data reduction amount of the dirty chunk B is ranked the highest or higher among the valid data reduction amounts of all dirty chunks of the storage device. Still optionally, it is determined whether the ratio of the valid data reduction amount of the dirty chunk B to the total valid data amount of the dirty chunk B is ranked the highest or higher among the ratios of the valid data reduction amounts of all dirty chunks of the storage device to the total valid data amount thereof. If the determination above is established, it is considered that the dirty chunk B satisfies the rejection policy.

If the dirty chunk B satisfies the rejection policy, collection is not performed on the dirty chunk B (740). If the dirty chunk B does not satisfy the rejection policy, GC is performed on the dirty chunk B (750). Moreover, the process returns to step 710 to start the next round of selection of dirty chunks to be collected.

Figure 8:
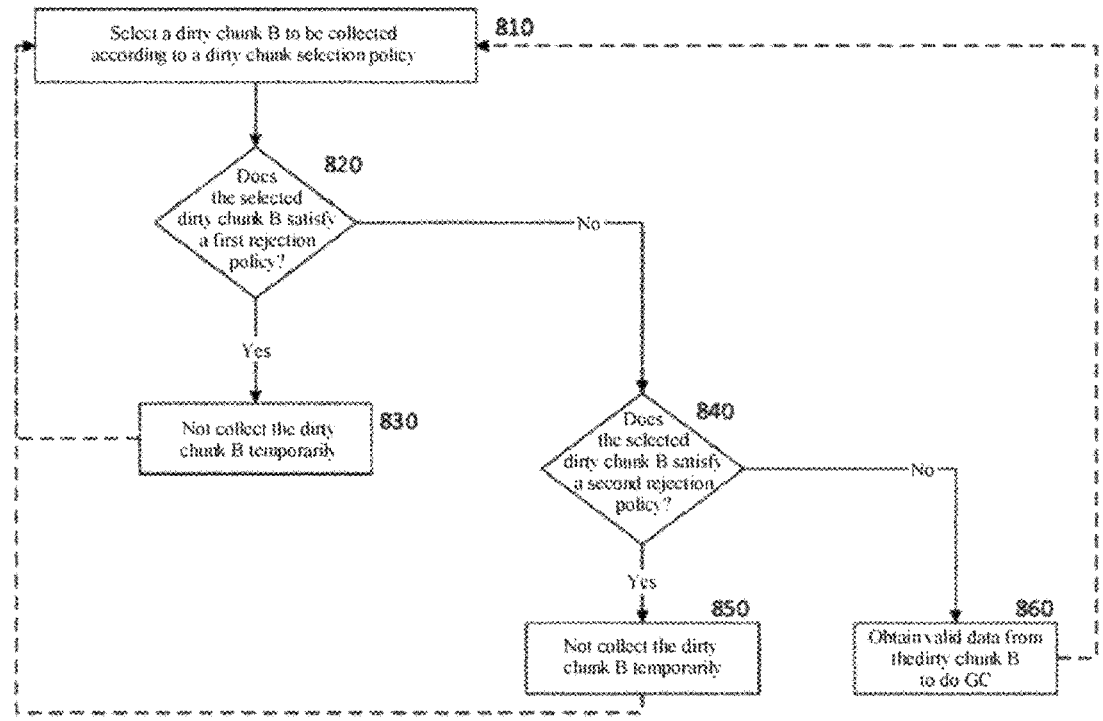
FIG. 8 is a flowchart for selection of a dirty chunk in GC according to a further embodiment of the present application.

FIG. 8 is a flowchart for selection of a dirty chunk in GC according to yet another embodiment of the present application.

In order to perform GC, the dirty chunk to be collected is selected from the storage device. The policy used is selected from a plurality of policies for selecting dirty chunks (refer to FIG. 5, policies 542, 544 and 546), and the dirty chunks to be collected (annotated as dirty chunk B) is further selected according to the selected policy (810).

A first rejection policy is applied to the dirty chunk B, and it is determined whether the dirty chunk B satisfies the first rejection policy (820). The first rejection policy is, for example, to determine whether to refuse to collect of the dirty chunk B according to the amount of change of the valid data of the dirty chunk B. If the dirty chunk B satisfies the first rejection policy, collection is not performed on the dirty chunk B (830). Moreover, the process returns to step 810 to start the next round of selection of dirty chunks to be collected.

If the dirty chunk B does not satisfy the first rejection policy, then a second rejection policy is applied to the dirty chunk B, and it is determined whether the dirty chunk B satisfies the second rejection policy (840). The second rejection policy is, for example, to refuse to collect of the dirty chunk B storing cold data under specified conditions. If the dirty chunk B satisfies the second rejection policy, collection is not performed on the dirty chunk B (850). Moreover, the process returns to step 810 to start the next round of selection of dirty chunks to be collected. If the dirty chunk B does not satisfy the second rejection policy, the valid data is obtained from the dirty chunk B for collection (860).

Figure 9:
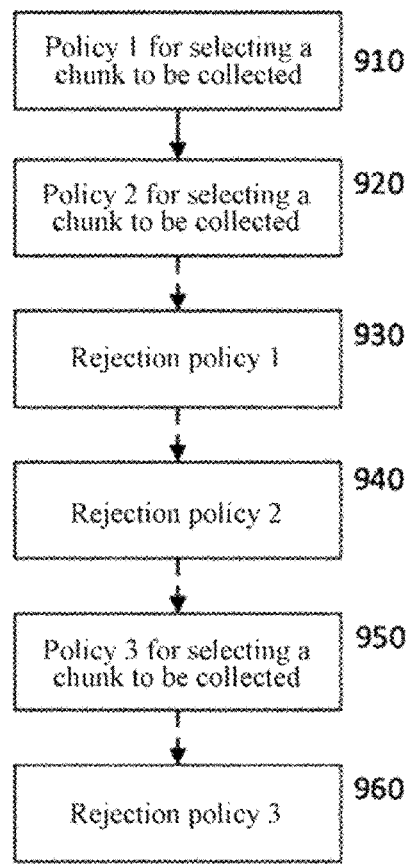
FIG. 9 is a flowchart for selection of a dirty chunk in GC according to yet another embodiment of the present application.

FIG. 9 is a flowchart for selection of a dirty chunk in GC according to still another embodiment of the present application.

In order to perform GC, the dirty chunk to be collected is selected from the storage device. There is a plurality of policies for selecting dirty chunks, such as policy 1, policy 2, and policy 3. Each time a dirty chunk is selected, one dirty chunk selection policy is applied, and when a plurality of dirty chunks is selected, a plurality of dirty chunk selection policies is applied in a combined manner. Therefore, the method of selecting dirty chunks in the GC process can be improved as new policies are proposed and/or the policies themselves are improved.

Referring to FIG. 9, in order to select the dirty chunks, a policy 1 for selecting the chunk to be collected is first applied to select the dirty chunk to be collected (910). By applying the policy 1 for selecting the chunk to be collected, one or more dirty chunks are obtained as alternative dirty chunks to be collected. Optionally or furthermore, a policy 2 for selecting the chunk to be collected is applied to select the dirty chunk to be collected again (920). By applying the policy 2 for selecting the chunk to be collected, one or more dirty chunks are further obtained as alternative dirty chunks to be collected.

GC may be performed on the alternative dirty chunks to be collected.

According to the embodiments of the present application, for the alternative dirty chunks to be collected, a rejection policy is also applied to determine whether to reject the alternative dirty chunks to be collected. There is a plurality of policies for rejecting the alternative dirty chunks, such as rejection policy 1, rejection policy 2, and rejection policy 3. In order to reject the alternative dirty chunks to be collected, an alternative dirty chunk rejection policy is applied, and a plurality of alternative dirty chunk rejection policies are optionally applied in a combined manner. Therefore, the method of selecting dirty chunks in the GC process can be improved as new rejection policies are proposed and/or the rejection policies themselves are improved.

Still referring to FIG. 9, after step 920, the rejection policy 1 is applied to the selected alternative dirty chunks (930) to remove one or more alternative dirty chunks from the alternative dirty chunks. The removed alternative dirty chunks are not collected in the GC. Understandably, the alternative dirty chunks rejected this time may be selected again when the policy of selecting the dirty chunks to be collected is applied next time, and are not rejected when the dirty chunk rejection policy is applied next time, so as to perform GC.

Optionally or furthermore, for the alternative dirty chunks selected after step 920, or for the alternative dirty chunks remaining after step 930, the rejection policy 2 is also applied (940), to remove one or more alternative dirty chunks from the alternative dirty chunks.

After one or more rejection policies are applied, the policy of selecting the dirty chunks to be collected may be applied again. For example, a policy 3 of selecting chunks to be collected is applied (950), to further select one or more dirty chunks from the dirty chunk set so as to expand the alternative dirty chunks. Optionally or furthermore, the rejection policy is also applied again to remove one or more alternative dirty chunks from the alternative dirty chunks (960).

Therefore, according to the embodiment of FIG. 9, the most suitable dirty chunk is obtained by ideally combining one or more policies of selecting the dirty chunks to be collected and one or more alternative dirty chunk rejection policies.

Furthermore, during the working period of the storage device, according to the working status of the storage device, the combination mode of the policies of selecting the dirty chunks to be collected and/or the alternative dirty chunk rejection policies is adjusted. For example, the combination mode of the policies of selecting the dirty chunks to be collected and/or the alternative dirty chunk rejection policies is determined according to the life cycle phase of the storage device; or the combination mode of the policies of selecting the dirty chunks to be collected and/or the alternative dirty chunk rejection policies is determined according to the workload of the storage device.

Figure 10:
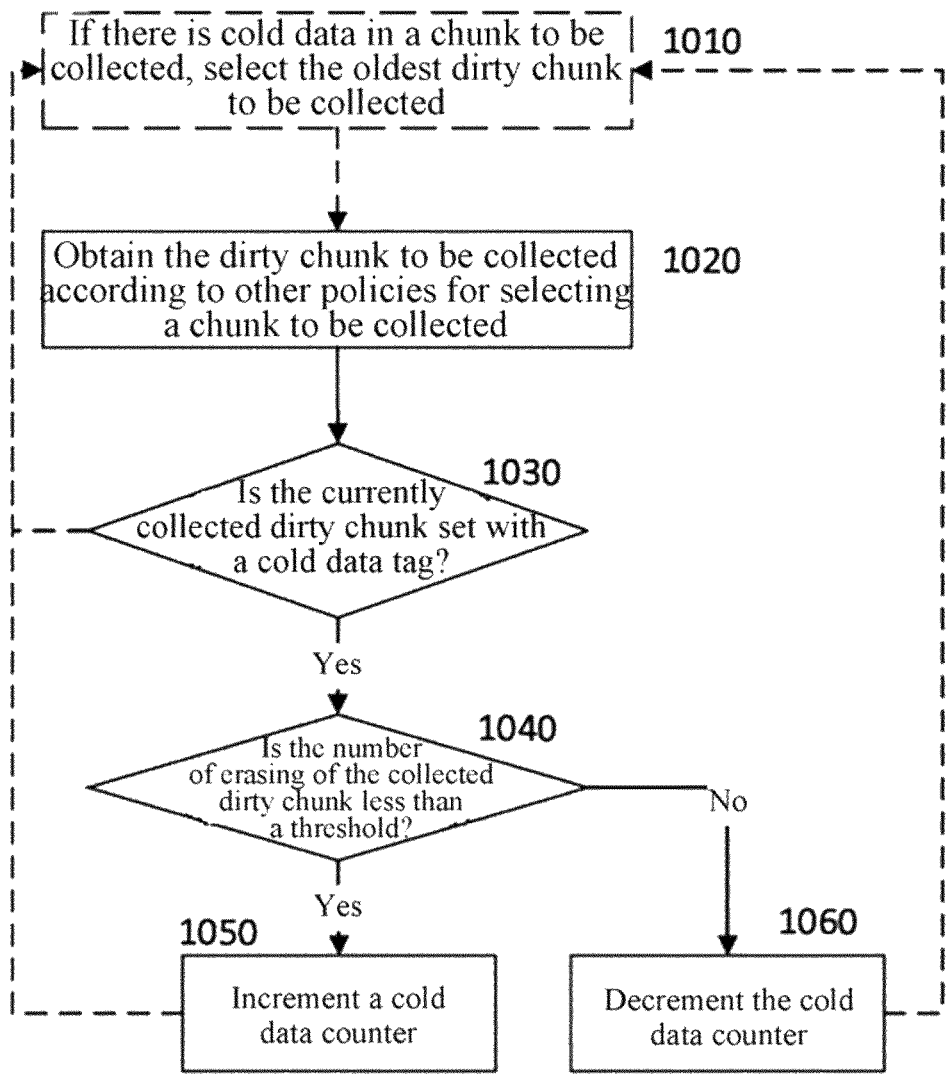
FIG. 10 is a flowchart for selection of a dirty chunk in GC according to still another embodiment of the present application.

FIG. 10 is a flowchart for selection of a dirty chunk in GC according to still another embodiment of the present application.

According to the embodiment of FIG. 10, when data is written into a chunk, a cold data tag is set on the chunk according to the characteristics of the written data. For example, if the written data is valid data from GC, the cold data tag is set on the chunk carrying the written data. As yet another example, if the written data comes from a user's write command, and the write command indicates that the data to be written is cold data, a cold data tag is set on the chunk carrying the written data. The indication of the write command that the written data is cold data may come from the user or from the processing of the storage device to the write command.

According to the storage device in the embodiment of FIG. 10, a cold data counter is also maintained, and the value of the cold data counter indicates whether there is cold data in the chunk to be collected of the storage device. For example, based on the cold data counter being greater than a specified threshold, it is determined that there is cold data in the chunk to be collected of the storage device; and based on the cold data counter being less than the threshold, it is determined that there is no cold data in the chunk to be collected of the storage device.

Referring to FIG. 10, as a policy for selecting chunks to be collected, if there is cold data in the current storage device, a dirty chunk with oldest data stored thereon is selected from a plurality of dirty chunks of the storage device as a chunk to be collected for GC (1010).

If the dirty chunk to be collected is not obtained according to step 1010, for example, the storage device currently has no cold data, the dirty chunk to be collected is obtained by means of other policies of selecting the chunk to be collected (1020). For example, the dirty chunk with the least valid data amount is selected among the dirty chunks as the dirty chunk to be collected.

According to the embodiment of FIG. 10, if the dirty chunk to be collected is selected in step 1010, step 1020 is no longer executed. If the dirty chunk to be collected is not selected in step 1010, the dirty chunk to be collected is obtained by executing step 1020.

Regardless of the dirty chunk selected in step 1010 or step 1020, it is identified whether there is a cold data tag in the selected dirty chunk (1030). If there is no cold data tag in the selected dirty chunk, the current selection process of the chunk to be collected ends, and the process may return to step 1010 to start the next selection process of the chunk to be collected.

In step 1030, if it is identified that the cold data tag is set in the selected dirty chunk, the number of erasing erases (annotated as PE1) of the selected dirty chunk is further obtained, and it is identified whether the number of erases PE1 is less than a specified threshold (1040). If the number of erasesPE1 is less than the specified threshold, the cold data counter is incremented (1050). If the number of erases PE1 is not less than the specified threshold, the cold data counter is decremented (1060). Moreover, the process returns to step 1010 to start the next selection process of the chunk to be collected.

As an example, the average number of erasing (annotated as PE2) of all chunks of the storage device, or the average number of erasing (annotated as PE3) of all dirty chunks of the storage device, or the result obtained by subtracting a specified value from PE2 or PE3 is taken as the specified threshold used in step 1040.

According to the embodiment shown in FIG. 10, the cold data counter is used to identify whether cold data is stored in the dirty chunk of the storage device, and the location of the cold data is indicated by the cold data tag on the dirty chunk. When there is cold data in the storage device, and the valid data of the dirty chunk that carries the cold data tag is retained by means of the processing flow shown in FIG. 10. When another chunk is written in the GC process, the cold data tag is retained, so as to realize the tracking of cold data, and the cold data is reasonably used in the selection process of dirty chunks of GC. Moreover, some cold data is no longer cold data over time, such as data related to the Spring Festival, which is cold data at ordinary times, but is no longer cold data with the arrival of the Spring Festival. As the GC process progresses, the dirty chunk with the data stored thereon being no longer cold data is selected and collected in step 1020. As such GC proceeds, the number of erasing of these chunks recording that the data us no longer cold data is gradually increased, and the chunks are detected in step 1040 and the process proceeds to step 1060, causing the cold data counter to decrement. When the cold data counter becomes sufficiently small, it is considered that there is no cold data in the storage device, although there are still cold data tags in some dirty chunks. Furthermore, when data is written into a blank chunk again, the cold data tag is no longer set in the written blank chunk. In this way, the cold data tag and the cold data counter are used in the GC process to realize the tracking of cold data in the storage device.

Optionally, in response to the period in which the cold data counter is less than the threshold, the amount of data written into the storage device exceeds a data amount threshold, the cold data counter is reset to make the cold data counter greater than the threshold.

Still optionally, when the storage device performs GC for the first time, the cold data counter is also reset to make the cold data counter greater than the threshold.

Figure 11A:
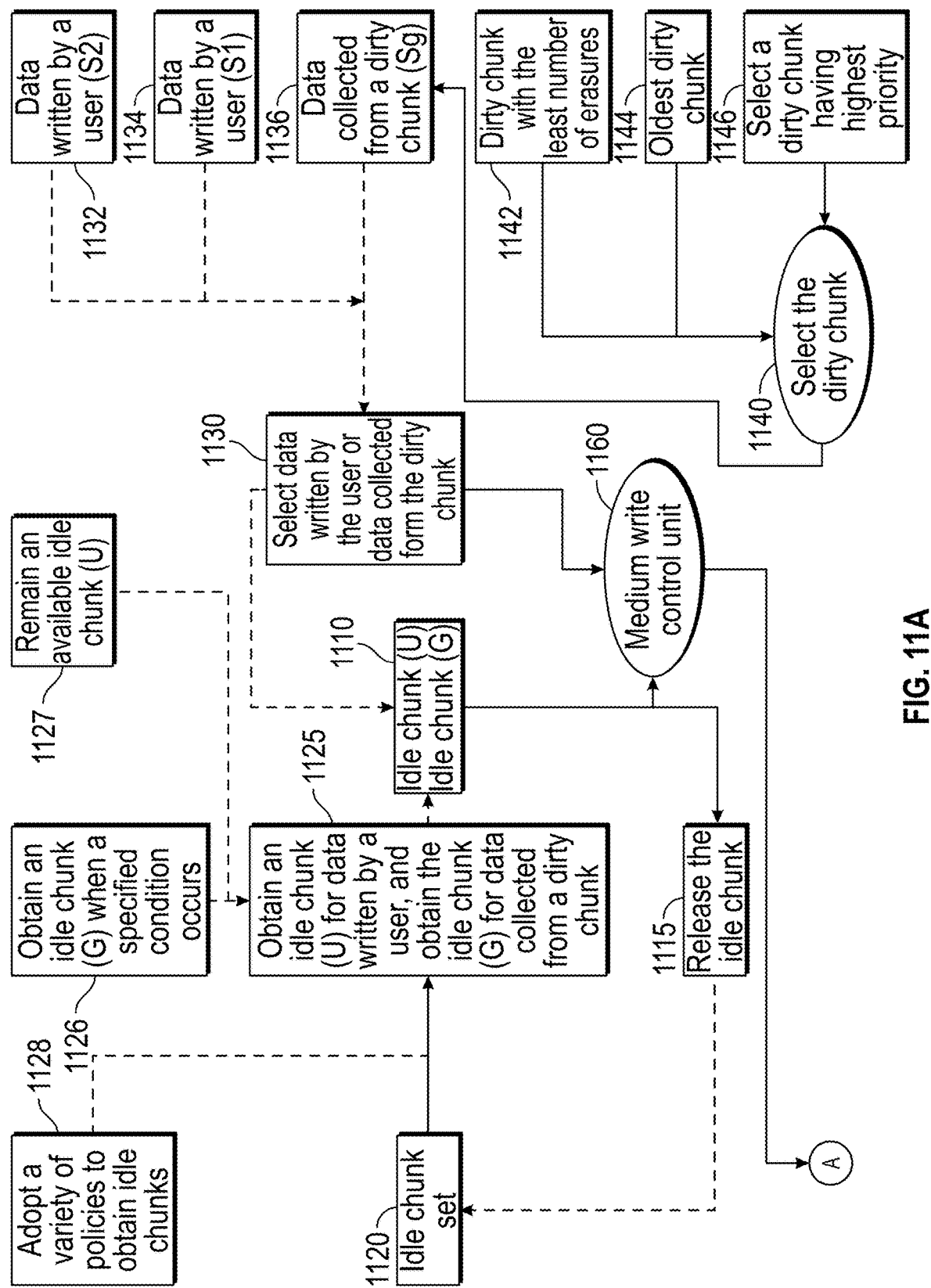
FIGS. 11A and 11B are schematic diagrams of a garbage data collection process according to another embodiment of the present application.
Figure 11B:
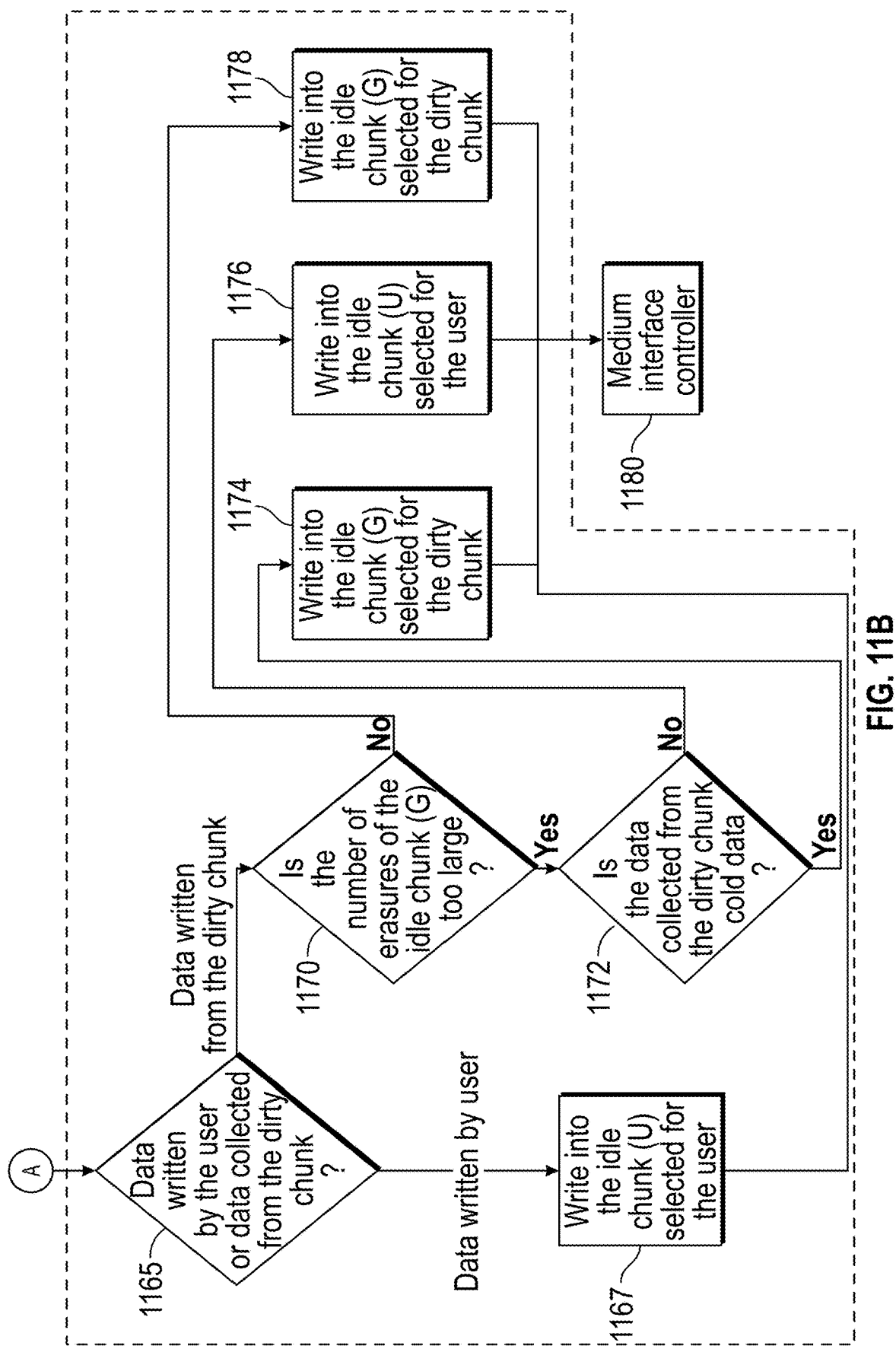

FIGS. 11A and 11B are schematic diagrams of a garbage data collection process according to another embodiment of the present application.

In the embodiment of FIGS. 11A and 11B, at least two idle chunks 1110 are provided, and the idle chunks are chunks to be or being written with data. The idle chunk (U) is configured to carry the data written by the user, and the idle chunk (G) is configured to carry the data collected from the dirty chunk in the GC operation. The data written into the idle chunk 1110 is the data to be written in the user IO request or the data to be written in the GC operation (1130). The medium writing control unit 1160 writes the data to be written in the user IO request or the data to be written in the GC operation into the idle chunk.

The dirty chunks that have completed the valid data collection are erased and released as idle chunks (1115). The released idle chunks are recorded in an idle chunk set 1120. Moreover, the idle chunk (U) configured to carry the data written by the user IO and/or the idle chunk (G) configured to carry the data written in the GC operation is obtained from the idle chunk set 1120 (1125).

In the embodiments according to the present application, available idle chunks (U) are remained in the storage device for a long time (1127). In the working process of the storage device, the idle chunk (U) is kept to receive data written by user IO that may appear at any time. For example, when the idle chunk (U) is filled with data, the idle chunk is immediately obtained from the idle chunk set 1120 as the idle chunk (U). During the GC operation, idle chunks (G) are provided to carry the data written in the GC operation. Therefore, in response to the GC operation being about to occur or having occurred, the idle chunk (G) may be obtained from the idle chunk set 1120. For example, when the number of idle chunks in the idle chunk set 1120 is too low (for example, lower than a threshold), it is prepared to start the GC operation and obtain the idle chunk (G) (1126).

A plurality of policies is adopted to obtain idle chunks from the idle chunk set 1120 (1128). As an example, the idle chunks in the idle chunk set 1120 are sorted according to the number of erasing. When the idle chunk 1110 is obtained from the idle chunk set 1120, the idle chunk with the least number of erasing is selected. As another example, the idle chunks in the idle chunk set 1120 are sorted according to the order in which the idle chunks are added to the idle chunk set 1120. When the idle chunks 1110 are obtained from the idle chunk set 1120, the idle chunk that is added to the idle chunk set 1120 earliest is selected. As yet another example, during selection of the idle chunk (U), the idle chunk with the least number of erasing is selected from the idle chunk set 1120, and during selection of the idle chunk (G), the idle chunk with the number of erasing being greater than the specified threshold is selected from the idle chunk set 1120. Optionally, if there is no idle chunk with the number of erasing being greater than the specified threshold in the idle chunk set 1120, the idle chunk with the maximum number of erasing or the idle chunk with difference between the number of erasing and the average number of erasing of all idle chunks in the idle chunk set 1120 being less than the threshold is selected.

In FIGS. 11A and 11B, reference numeral 1134 indicates data to be written by the user IO and belonging to stream S1, and reference numeral 1132 indicates data to be written by the user IO and belonging to stream S2. Moreover, optionally, reference numeral 1132 indicates data to be written in the GC operation and belonging to the stream Sg.

In the embodiment of FIGS. 11A and 11B, a variety of policies are used to select the dirty chunks to be collected in the GC process (1140). For example, the policy 1142 indicates to select the dirty chunk with the least number of erasing times, the policy 1144 indicates to select the oldest dirty chunk, and the policy 1146 indicates to select the dirty chunk having highest priority. The policy 1142 and the policy 1144 are used for static wear-leveling, and the policy 1146 is used for dynamic wear-leveling.

As an example, each policy has different weight, and one of the policies is selected in a weighted round-robin manner. As yet another example, the selection of policy is related to the occurrence of specified conditions. For example, in response to the number of erasing of the idle chunk 1110 being too large or the number of erasing of the idle chunk (U) being too large, the policy 1142 and/or the policy 1144 is selected to select the dirty chunk. For another example, in response to the age of the oldest dirty chunk exceeding the threshold, the priority of the policy 1144 is temporarily improved. In another example, the policy 1142 and/or the policy 1144 is selected periodically or in response to the user's indication, or the priority of the policy 1142 and/or the policy 1144 is improved.

According to the embodiment of FIGS. 11A and 11B, the medium writing control unit 1160 adopts different processing methods for the data written by the user IO and the data written in the GC operation (1165). For the data written by the user IO, the medium writing control unit 1160 writes the data into the idle chunk (U) prepared for the user IO (1167). For the data written in the GC operation, the medium writing control unit 1160 further identifies the features of the idle chunks (G) prepared in the GC operation and the data written in the GC operation. For example, it is identified whether the number of erasing of the idle chunks (G) (or the difference between the average number of erasing of the idle chunks in the idle chunk set and the predetermined number of erasing) is too large (for example, greater than a threshold, where the threshold is a specified value) (1170), if the number of erasing of the idle chunks (G) is not too large, the data written in the GC operation is written into the idle chunk (G) (1178). If the number of erasing of the idle chunks (G) is too large, it is further determined whether the data written in the GC operation is cold data (1172). If the data written in the GC operation is cold data, the data is written into the idle chunk (G) (1174), and if the data written in the GC operation is not cold data, the data is written into the idle chunk (U) (1176).

Optionally, the order of step 1170 and step 1172 may be reversed or occur simultaneously.

As an example, it is identified whether the data is cold data according to the age of the data, and data whose age is greater than a threshold is identified as cold data. As another example, the data written in the GC operation is identified as cold data. In yet another example, whether the data is cold data is identified based on an identifier stored associated with the data written in the GC operation. The cold data identification scheme in the prior art is also applicable to the embodiments according to the present application.

Figure 12A:
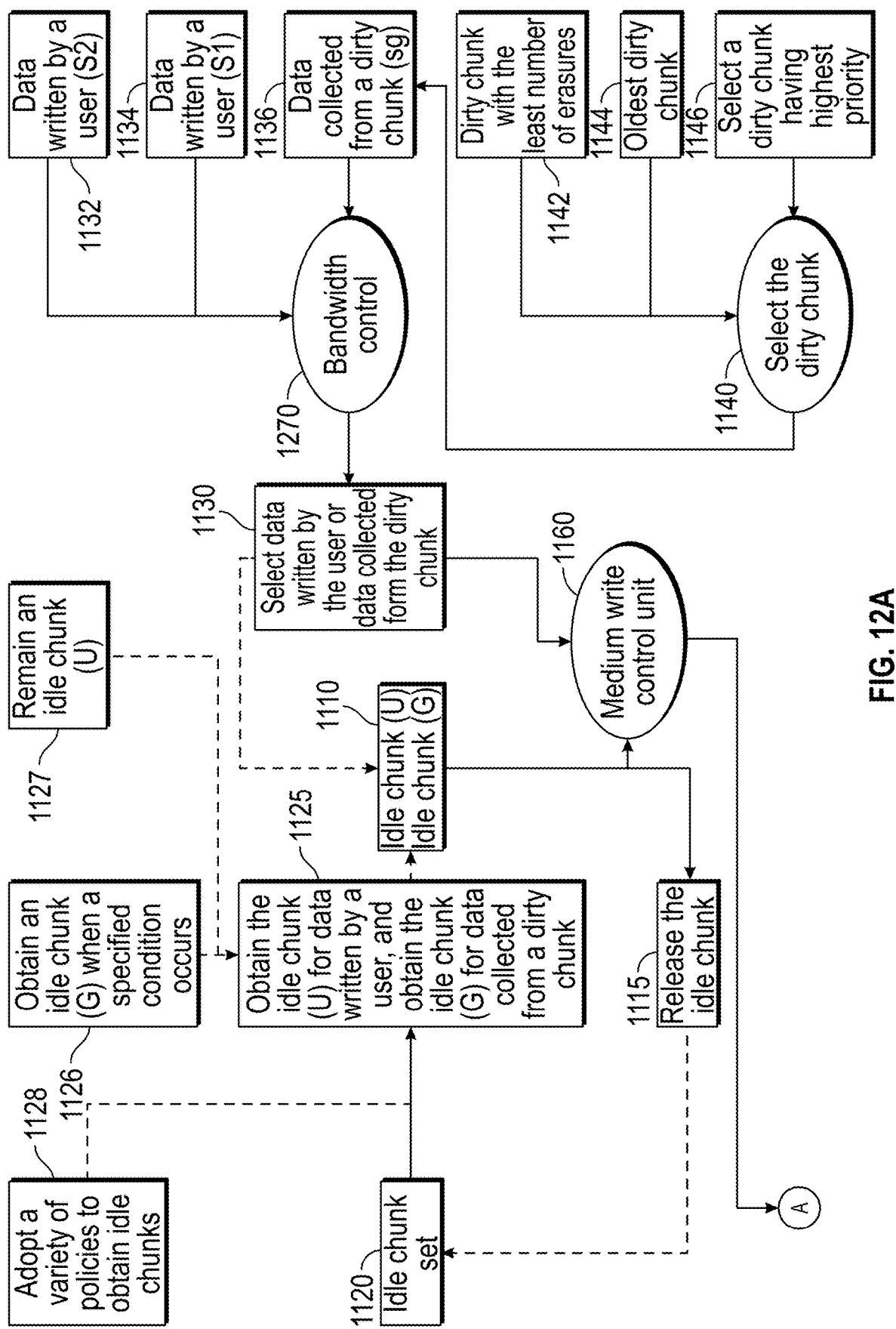
FIGS. 12A and 12B are schematic diagrams of a garbage data collection process according to still another embodiment of the present application.
Figure 12B:
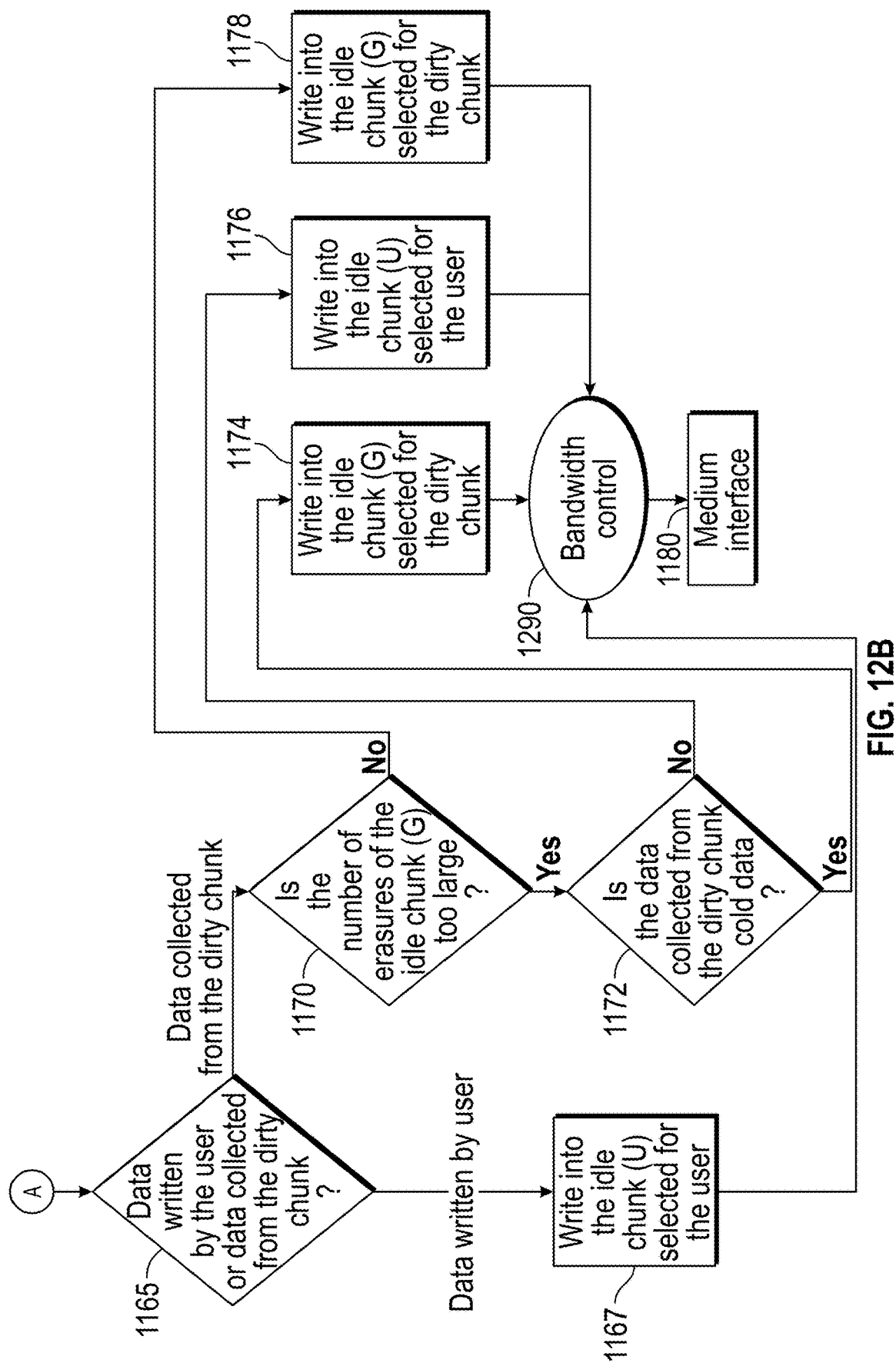

FIGS. 12A and 12B are schematic diagrams of a garbage data collection process according to still another embodiment of the present application.

In this embodiment, at least two idle chunks 1110 are provided. The idle chunk (U) is configured to carry the data written by the user IO, and the idle chunk (G) is configured to carry the data written in the GC operation. The data written into the idle chunk 1110 is the data to be written by the user IO request or the data collected from the dirty chunk in the GC operation (1130). The medium writing control unit 660 writes the data to be written in the user IO request or the data to be written in the GC operation into the idle chunk.

The dirty chunks that have completed the valid data collection are erased and released as idle chunks (1115). The released idle chunks are recorded in an idle chunk set 1120. The idle chunk (U) configured to carry the data written by the user IO and/or the idle chunk (G) configured to carry the data written in the GC operation is obtained from the idle chunk set 1120 (1125).

In this embodiment, a bandwidth control unit 1270 controls the bandwidth for obtaining the data written by the user and the data collected from the dirty chunk (for example, controlling the bandwidth provided for obtaining the stream S1, the stream S2, and/or the stream Sg). The overall bandwidth of the solid-state storage device written into a storage medium is limited. The bandwidth control unit 1270 allocates limited bandwidth to the stream S1, the stream S2, and/or the stream Sg, thereby balancing the impact of the GC process on the performance of the user IO. For example, the bandwidth control unit 1270 provides 80% of the overall bandwidth to obtain the data written by the user IO (the stream S1 and/or the stream S2), and 20% of the overall bandwidth to obtain the data to be written in the GC operation. For another example, when the GC process is not processed, all bandwidths are provided to obtain the data written by the user IO. When the GC process is processed, the bandwidth occupied by the data to be written in the GC operation does not exceed 20% of the overall bandwidth.

Optionally, the bandwidth control unit 1270 achieves bandwidth control by controlling, processing and obtaining the ratio of the data written by the user IO to the data written by the GC operation. For example, the bandwidth control unit 1270 only processes a piece of data written by the GC operation every time it processes four pieces of data written by the user IO, to realize that the bandwidth control unit provides 80% of the total bandwidth to the user IO (the stream S1 and/or the Stream S2) and 20% of the overall bandwidth to the GC operation. In another example, the bandwidth control unit 1270 only processes 16 KB of obtained data written by the GC operation every time it processes 64 KB of obtained data written by the user IO. Still optionally, when the number of idle chunks in the idle chunk set 1120 is too few, it is necessary to speed up the processing of the GC process. For this purpose, the bandwidth control unit 1270 allocates more bandwidths to the GC operation. Still optionally, in some cases, some user IOs need to be processed first and the quality of service is guaranteed. For example, the user IO constituting the stream S2 needs to be processed with the best quality of service. For this purpose, in the case of the stream S2, the bandwidth control unit 1270 allocates more bandwidths to the stream S2, and it is also necessary to ensure that sufficient bandwidth is provided for the GC operation to prevent the idle chunks in the idle chunk set 1120 from being exhausted.

In the embodiment of FIGS. 12A and 12B, a variety of policies are used to select the dirty chunks to be collected in the GC process (1140). As an example, each policy has different weight, and one of the policies is selected in a weighted round-robin manner.

According to the embodiment of FIGS. 12A and 12B, the medium writing control unit 1160 adopts different processing methods for the data written by the user IO and the data written in the GC operation (1165). For the data written by the user IO, the medium writing control unit 1160 writes the data into the idle chunk (U) prepared for the user IO (1167). For the data written in the GC operation, the medium writing control unit 1160 further identifies the features of the idle chunks (G) prepared in the GC operation and the data written in the GC operation. For example, it is identified whether the number of erasing of the idle chunk (G) is too large (1170), if the number of erasing of the idle chunk (G) is not too large, the data written in the GC operation is written into the idle chunk (G) (1178). If the number of erasing of the idle chunks (G) is too large, it is further determined whether the data written in the GC operation is cold data (1172). If the data written in the GC operation is cold data, the data is written into the idle chunk (G) (1174), and if the data written in the GC operation is not cold data, the data is written into the idle chunk (U) (1176).

Optionally, a bandwidth control unit 1290 is provided to coordinate the bandwidth for writing the data written by the user IO/the data written in the GC operation into the idle chunk (U)/idle chunk (G). The overall bandwidth of the solid-state storage device written into a storage medium is limited. The bandwidth control unit 1290 allocates limited bandwidth to write the data written by the user IO into the idle chunk and to write the data written in GC operation into the idle chunk, thereby balancing the impact of the GC process on the performance of the user IO. For example, the bandwidth control unit 1290 provides 80% of the overall bandwidth to write the data written by the user IO into the idle chunk (1167), and 20% of the overall bandwidth to write the data written in the GC operation into the idle chunks (1174, 1176 and 1178). For another example, when the GC process is not processed, all bandwidths are provided to write the data written by the user IO into the idle chunk. When the GC process is processed, the bandwidth occupied by writing the data written in the GC operation into the idle chunk does not exceed 20% of the overall bandwidth.

Optionally, the bandwidth control unit 1290 implements bandwidth control by controlling the ratio of writing the data written by the user IO into the idle chunk to writing the data written in the GC operation into the idle chunk. Still optionally, when the number of idle chunks in the idle chunk set 1120 is too few, it is necessary to speed up the processing of the GC process. For this purpose, the bandwidth control unit 1270 allocates more bandwidths to write the data collected from the dirty chunk into the idle chunk. Still optionally, in some cases, the user IOs need to be processed first and the quality of service is guaranteed. For this purpose, the bandwidth control unit 1270 allocates more bandwidth to write the data written by the user into idle chunks, and it is also necessary to ensure that sufficient bandwidth is provided for writing the data collected from the dirty chunk into the idle chunk to prevent the idle chunks in the idle chunk set 1120 from being exhausted.

According to the embodiments of the present application, the bandwidth control unit 1270 and the bandwidth control unit 1290 may exist at the same time. Optionally, one of the bandwidth control unit 1270 and the bandwidth control unit 1290 is used to implement bandwidth control in the user IO and GC operations.

Although the preferred embodiments of the present application are described, a person skilled in the art can make additional changes and modifications to these embodiments once knowing the basic creative concept. Therefore, the appended claims are intended to be interpreted as including the preferred embodiments and all changes and modifications falling within the scope of the present application. It is apparent that various modifications and variations can be made to the present application by a person skilled in the art without departing from the spirit and scope of the present application. In this way, if these modifications and variations made to the present application fall within the scope of the claims of the present application and equivalent techniques thereof, the present application is also intended to include these modifications and variations.

The invention claimed is:

1. A method for Garbage Collection (GC), wherein a plurality of selection policies is provided, a first idle chunk and a second idle chunk are provided, an idle chunk is a chunk into which data is to be written, idle chunks are obtained from an idle chunk set, and data written by a user is written into the first idle chunk, the method including:

selecting at least a first selection policy from the plurality of selection policies based on a specified condition to obtain a dirty chunk to be collected from one or more selection policies, wherein the plurality of selection policies is selected from at least one of the following: in turn, or each policy of the plurality of selection policies has a different weight, or related to an occurrence of specified conditions;

obtaining, according to the selecting the at least first selection policy from the plurality of selection policies based on a specified condition, a first dirty chunk to be collected;

determining, according to selecting at least a first rejection policy from the plurality of selection policies based on a specified condition, whether to refuse to collect the first dirty chunk;

in response to determining according to the selecting the at least first rejection policy from the plurality of selection policies based on a specified condition that the first dirty chunk is rejected, GC not being performed on the first dirty chunk;

in response to determining according to the selecting the at least first rejection policy from the plurality of selection policies based on a specified condition that the first dirty chunk is not rejected, GC being performed on the first dirty chunk, wherein in response to a number of erases of the second idle chunk being less than a difference between an average number of erases of the idle chunk set and a predetermined number, data collected from the first dirty chunk is written into the second idle chunk, in response to the number of erases of the second idle chunk being greater than the difference between the average number of erases of the idle chunk set and the predetermined number, whether the data collected from the first dirty chunk is cold data is determined, and in response to the data collected from the first dirty chunk being cold data, the data collected from the first dirty chunk is written into the second idle chunk, otherwise, the data collected from the first dirty chunk is written into the first idle chunk; and in response to the first dirty chunk to be collected not satisfying the first rejection policy from the plurality of selection policies based on a specified condition, applying a second rejection policy from the plurality of selection policies based on a specified condition, and determining whether the first dirty chunk satisfies the second rejection policy;

wherein the first rejection policy from the plurality of selection policies based on a specified condition identifies changes in a valid data amount in the first dirty chunk, the second rejection policy from the plurality of selection policies based on a specified condition identifies whether valid data in the first dirty chunk is cold data, or the second rejection policy from the plurality of selection policies based on a specified condition identifies whether the valid data in the first dirty chunk is hot data.

2. The method for GC according to claim 1, further including:

in response to determining according to the selecting the at least first rejection policy from the plurality of selection policies based on a specified condition that collecting of the first dirty chunk is rejected, obtaining, according to the selecting the at least first rejection policy from the plurality of selection policies based on a specified condition again, a second dirty chunk to be collected.

3. The method for GC according to claim 2, wherein the at least first selection policy selected from the plurality of selection policies indicates that a dirty chunk with a maximum amount of valid data is selected from dirty chunks of a storage device as a dirty chunk to be collected.

4. The method for GC according to claim 3, wherein the at least first rejection policy selected from the plurality of selection policies indicates that a dirty chunk with an amount of change of the valid data greater than a threshold, is rejected to be collected;

the at least first rejection policy selected from the plurality of selection policies indicates that the dirty chunk with the amount of change of the valid data greater than the threshold within a specified period of time, is rejected to be collected;

the at least first rejection policy selected from the plurality of selection policies indicates that the dirty chunk with a ratio of the valid data reduction amount to the valid data amount greater than the threshold, is rejected to be collected; or the at least first rejection policy selected from the plurality of selection policies indicates that the dirty chunk with the valid data reduction amount ranks less than a threshold in all dirty chunks, is rejected to be collected.

5. The method for GC according to claim 4, wherein in response to a ratio of the valid data reduction amount of the first dirty chunk to the total valid data reduction amount of all dirty chunks of the storage device being less than the threshold, the at least first rejection policy selected from the plurality of selection policies indicates that the first dirty chunk is rejected to be collected; or in response to the rank of the ratio of the valid data reduction amount of the first dirty chunk to the total valid data reduction amount of all dirty chunks of the storage device in the ratios of the valid data reduction amount of the first dirty chunk to the total valid data reduction amount of all dirty chunks of the storage device in respective dirty chunks being less than a threshold, the at least first rejection policy selected from the plurality of selection policies indicates that the first dirty chunk is rejected to be collected.

6. The method for GC according to claim 5, further including:

obtaining, according to a second selection policy selected from the plurality of selection policies, a third dirty chunk to be collected; and determining, according to the at least first rejection policy selected from the plurality of selection policies, whether to refuse to collect the third dirty chunk.

7. The method for GC according to claim 6, further including:

determining, according to the second rejection policy selected from the plurality of selection policies, whether to refuse to collect the first dirty chunk.

8. The method for GC according to claim 7, wherein the second rejection policy selected from the plurality of selection policies indicates that in response to the data stored in the first dirty chunk being hot data, the first dirty chunk is rejected to be collected.

9. The method for GC according to claim 8, wherein the second selection policy selected from the plurality of selection policies indicates that a dirty chunk with a maximum number of erases is selected from dirty chunks of the storage device as the dirty chunk to be collected.

10. A method for GC, wherein a plurality of selection policies is provided, a first idle chunk and a second idle chunk are provided, an idle chunk is a chunk into which data is to be written, idle chunks are obtained from an idle chunk set, and data written by a user is written into the first idle chunk, the method including:

obtaining, according to at least a first selection policy selected from the plurality of selection policies based on a specified condition, a dirty chunk to be collected, wherein the plurality of selection policies is selected from at least one of the following: in turn, or each policy of the plurality of selection policies has a different weight, or related to an occurrence of specified conditions; and in response to the dirty chunk to be collected being not obtained according to the first selection policy selected from the plurality of selection policies based on the specified condition, also obtaining, the dirty chunk to be collected according to a second selection policy based on the specified condition; wherein in response to the first selection policy selected from the plurality of selection policies indicating that there is currently cold data in a storage device, a dirty chunk with oldest data stored thereon is selected from a plurality of dirty chunks of the storage device as the dirty chunk to be collected;

the second selection policy selected from the plurality of selection policies indicates that a dirty chunk with a maximum amount of valid data is selected from dirty chunks of the storage device as the dirty chunk to be collected;

in response to a number of erases of the second idle chunk being less than a difference between an average number of erases of the idle chunk set and a predetermined number, data collected from the dirty chunk is written into the second idle chunk, in response to the number of erases of the second idle chunk being greater than the difference between the average number of erases of the idle chunk set and the predetermined number, whether the data collected from the dirty chunk is cold data is determined; and in response to the data collected from the dirty chunk being cold data, the data collected from the dirty chunk is written into the second idle chunk, otherwise, the data collected from the dirty chunk is written into the first idle chunk.

11. The method for GC according to claim 10, wherein whether there is the currently cold data in the storage device is identified according to a value of a cold data counter.

12. The method for GC according to claim 11, further including:

collecting the valid data of the dirty chunk to be collected; and in response to the dirty chunk to be collected being set with a cold data tag, and a number of erases of the dirty chunk to be collected being less than a threshold of the number of erases, incrementing the cold data counter.

13. The method for GC according to claim 12, further including:

in response to the dirty chunk to be collected being set with the cold data tag, and the number of erases of the dirty chunk to be collected being not less than the threshold of the number of erases, decrementing the cold data counter.

14. The method for GC according to claim 13, wherein an average number of erases of all chunks of the storage device or the average number of erases of all dirty chunks of the storage device is taken as the threshold of the number of erases.

15. A storage device, wherein a plurality of selection policies is provided, a first idle chunk and a second idle chunk are provided, an idle chunk is a chunk into which data is to be written, idle chunks are obtained from an idle chunk set, and data written by a user is written into the first idle chunk, the storage device comprising:

a non-volatile memory chip storing a program; and
a control component connected to the non-volatile memory chip, wherein the control component executes the program to cause the control component to perform:
   selecting at least a first selection policy from the plurality of selection policies based on a specified condition to obtain a dirty chunk to be collected from one or more selection policies, wherein the plurality of selection policies is selected from at least one of the following: in turn, or each policy of the plurality of selection policies has a different weight, or related to an occurrence of specified conditions;
   obtaining, according to the selecting the at least first selection policy from the plurality of selection policies based on a specified condition, a first dirty chunk to be collected;
   determining, according to selecting at least a first rejection policy from the plurality of selection policies based on a specified condition, whether to refuse to collect the first dirty chunk;
   in response to determining according to the selecting the at least first rejection policy from the plurality of selection policies based on a specified condition that the first dirty chunk is rejected, garbage collection (GC) not being performed on the first dirty chunk;
   in response to determining according to the selecting the at least first rejection policy from the plurality of selection policies based on a specified condition that the first dirty chunk is not rejected, GC being performed on the first dirty chunk, wherein
      in response to a number of erases of the second idle chunk being less than a difference between an average number of erases of the idle chunk set and a predetermined number, data collected from the first dirty chunk is written into the second idle chunk,
      in response to the number of erases of the second idle chunk being greater than the difference between the average number of erases of the idle chunk set and the predetermined number, whether the data collected from the first dirty chunk is cold data is determined, and
      in response to the data collected from the first dirty chunk being cold data, the data collected from the first dirty chunk is written into the second idle chunk, otherwise, the data collected from the first dirty chunk is written into the first idle chunk; and
   in response to the first dirty chunk not satisfying the first rejection policy from the plurality of selection policies based on a specified condition, applying a second rejection policy from the plurality of selection policies based on a specified condition, and determining whether the first dirty chunk satisfies the second rejection policy;
wherein the first rejection policy from the plurality of selection policies based on a specified condition identifies changes in a valid data amount in the first dirty chunk, the second rejection policy from the plurality of selection policies based on a specified condition identifies whether valid data in the first dirty chunk is cold data, or the second rejection policy from the plurality of selection policies based on a specified condition identifies whether the valid data in the first dirty chunk is hot data.

* * * * *